United States Patent
Soh et al.

(10) Patent No.: US 11,914,803 B2
(45) Date of Patent: Feb. 27, 2024

(54) ELECTRONIC DEVICE FOR CONTROLLING EXTERNAL ELECTRONIC DEVICES USING RELATIVE POSITION INFORMATION AND OPERATING METHOD THEREOF

(71) Applicant: SAMSUNG ELECTRONICS CO., LTD., Suwon-si (KR)

(72) Inventors: Byungseok Soh, Suwon-si (KR); Daeyeon Yun, Suwon-si (KR); Eungsik Yoon, Suwon-si (KR); Hyeyun Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/961,280

(22) Filed: Oct. 6, 2022

(65) Prior Publication Data

US 2023/0060497 A1   Mar. 2, 2023

Related U.S. Application Data

(63) Continuation of application No. PCT/KR2022/012241, filed on Aug. 17, 2022.

(30) Foreign Application Priority Data

Aug. 23, 2021  (KR) .................. 10-2021-0110695
Feb. 7, 2022   (KR) .................. 10-2022-0015253

(51) Int. Cl.
*G06F 3/038*    (2013.01)
*G06F 3/0346*   (2013.01)

(52) U.S. Cl.
CPC .......... *G06F 3/0383* (2013.01); *G06F 3/0346* (2013.01)

(58) Field of Classification Search
CPC .. C12N 9/12; C12Q 1/6883; C12Q 2600/112; C12Q 2600/156; G06F 3/0346; G06F 3/0383; Y02P 20/52

See application file for complete search history.

(56) References Cited

U.S. PATENT DOCUMENTS 10,068,463 B2   9/2018  Tchedikian
10,255,799 B2   4/2019  Tchedikian
11,360,547 B2*  6/2022  Jin .................... H04M 1/72412
(Continued)

FOREIGN PATENT DOCUMENTS

EP   3 172 727     9/2019
KR   10-0580648    5/2006
(Continued)

OTHER PUBLICATIONS

Search Report dated Nov. 23, 2022 in counterpart International Patent Application No. PCT/KR2022/012241.

*Primary Examiner* — Chun-Nan Lin
(74) *Attorney, Agent, or Firm* — Nixon & Vanderhye, P.C.

(57) ABSTRACT

An example electronic device may determine relative position information of the remote control device to the electronic device; calculate a yaw angle of an aiming direction of the remote control device in a global coordinate system based on coordinates of the remote control device and on the electronic device; and based on the coordinates and the yaw angle, determine a target device to be controlled by the remote control device.

20 Claims, 15 Drawing Sheets

(56) References Cited

U.S. PATENT DOCUMENTS

| | | | |
|---|---|---|---|
| 2011/0063521 A1* | 3/2011 | Karaoguz | H04N 21/47815 |
| | | | 348/734 |
| 2012/0194427 A1* | 8/2012 | Lee | G06F 3/033 |
| | | | 345/157 |
| 2016/0154478 A1* | 6/2016 | Choi | G06F 3/03542 |
| | | | 345/158 |
| 2017/0213449 A1* | 7/2017 | Tchedikian | G06F 3/017 |
| 2018/0322774 A1* | 11/2018 | Wang | G08C 17/02 |
| 2019/0180609 A1 | 6/2019 | Tchedikian | |
| 2021/0044741 A1* | 2/2021 | Colafrancesco | H04N 23/635 |
| 2021/0250406 A1* | 8/2021 | Wang | H04L 67/125 |
| 2021/0349177 A1* | 11/2021 | Colafrancesco | G01S 3/48 |

FOREIGN PATENT DOCUMENTS

| | | |
|---|---|---|
| KR | 10-1060575 | 8/2011 |
| KR | 10-2017-0001435 | 1/2017 |
| KR | 10-2217556 | 2/2021 |
| KR | 10-2021-0048959 | 5/2021 |
| WO | 2020/049527 | 3/2020 |

\* cited by examiner

ELECTRONIC DEVICE FOR CONTROLLING EXTERNAL ELECTRONIC DEVICES USING RELATIVE POSITION INFORMATION AND OPERATING METHOD THEREOF

CROSS-REFERENCE TO RELATED APPLICATIONS

This application is a continuation application of International Application No. PCT/KR2022/012241 designating the United States, filed on Aug. 17, 2022, in the Korean Intellectual Property Receiving Office and claiming priority to Korean Patent Application No. 10-2021-0110695, filed on Aug. 23, 2021, in the Korean Intellectual Property Office, and to Korean Patent Application No. 10-2022-0015253, filed on Feb. 7, 2022, in the Korean Intellectual Property Office, the disclosures of all of which are incorporated by reference herein in their entireties.

BACKGROUND

1. Field

The disclosure relates to an electronic device for controlling external electronic devices and an operating method thereof.

2. Description of Related Art

Ultra-wideband (UWB) communication is communication technology for transmitting a signal using a very short pulse (a few nanoseconds) at low power over a wide band, compared to conventional communication. In the past, the UWB communication has been used for military purposes, such as military radar and remote detection. However, since 2002, when the Federal Communications Commission (FCC) of the United States allowed its commercial use for indoor wireless communication, the UWB communication has been widely used in various fields. Through the UWB communication, a time of arrival (TOA) at which a pulse reaches a target and an angle of arrival (AOA) of the pulse from a transmitter are accurately measured, and accordingly, precise distance and position recognition indoors is possible with an error of tens of centimeters.

SUMMARY

In a device for determining a target device to be controlled, based on an aiming direction, using Ultra-wideband (UWB) communication indoors, the target device to be controlled may be determined based on an aiming direction of a remote control device. To obtain information on the aiming direction of the remote control device, a virtual coordinate system may be set.

Various example embodiments of the disclosure may provide an electronic device for obtaining information on the aiming direction of a remote control device by setting a global coordinate system based on a reference electronic device in an indoor environment.

According to an example embodiment, an electronic device includes a communication module configured to perform communication through one or more antennas; a sensor module configured to measure a yaw angle of the electronic device; a memory configured to store computer-executable instructions; and a processor configured to execute the computer-executable instructions by accessing the memory, where the computer-executable instructions, when executed, configure the electronic device to determine relative position information of the remote control device to the electronic device; based on the relative position information, yaw angle information of the electronic device that is measured by the sensor module, and yaw angle information of the remote control device, calculate a yaw angle of an aiming direction of the remote control device in a global coordinate system based on coordinates of the remote control device and on the electronic device; and based on the coordinates of the remote control device and the yaw angle of the aiming direction of the remote control device, determine a target device to be controlled by the remote control device.

According to an example embodiment, the computer-executable instructions may further configure the processor to control the electronic device to, when the target device to be controlled has been determined, control the target device by the remote control device.

According to an example embodiment, the computer-executable instructions may further configure the processor to control the electronic device to, based on the yaw angle of the aiming direction of the remote control device in the global coordinate system, a pitch angle of the remote control device, and a roll angle of the remote control device, calibrate aiming information of the remote control device.

According to an example embodiment, the relative position information may include information on a distance from the remote control device to the electronic device, and information on a direction from the remote control device to the electronic device and an angle corresponding to the aiming direction of the remote control device.

According to an example embodiment, the relative position information of the remote control device to the electronic device may be determined based on information on a distance from each of the plurality of antennas included in the remote control device to the electronic device, and information on distances between the plurality of antennas.

According to an example embodiment, the yaw angle of the remote control device may be measured by the sensor module included in the remote control device.

According to an example embodiment, the electronic device may perform ultra-wideband (UWB) communication with the remote control device.

According to an example embodiment, the computer-executable instructions may configure the processor control the electronic device to determine the target device to be controlled, based on the coordinates of the remote control device in the global coordinate system, the yaw angle of the aiming direction of the remote control device, and a preregistered sensible region.

According to an example embodiment, the remote control device includes two antennas, and the aiming direction of the remote control device is determined to be a direction perpendicular to a straight line connecting the two antennas.

According to an example embodiment, an operating method of an electronic device includes determining relative position information of a remote control device to the electronic device; based on the relative position information, yaw angle information of the electronic device, and yaw angle information of the remote control device, calculating coordinates of the remote control device and a yaw angle of an aiming direction of the remote control device in a global coordinate system based on the electronic device; and based on the coordinates of the remote control device and the yaw angle of the aiming direction of the remote control device, determining a target device to be controlled by the remote control device.

According to an example embodiment, when the target device to be controlled has been determined, the operating method may further include controlling the target device to be controlled by the remote control device.

According to an example embodiment, the operating method may further include, based on the yaw angle of the aiming direction of the remote control device in the global coordinate system, a pitch angle of the remote control device, and a roll angle of the remote control device, calibrating aiming information of the remote control device.

According to an example embodiment, the relative position information may include information on a distance from the remote control device to the electronic device, and information on a direction from the remote control device to the electronic device and an angle corresponding to the aiming direction of the remote control device.

According to an example embodiment, the relative position information of the remote control device to the electronic device may be determined based on information on a distance from each of the plurality of antennas included in the remote control device to the electronic device, and information on distances between the plurality of antennas.

According to an example embodiment, the yaw angle of the remote control device may be measured by the sensor module included in the remote control device.

According to an example embodiment, the electronic device may perform ultra-wideband (UWB) communication with the remote control device.

According to an example embodiment, the determining of the target device to be controlled may include determining the target device to be controlled, based on the coordinates of the remote control device in the global coordinate system, the yaw angle of the aiming direction of the remote control device, and a preregistered sensible region.

According to an example embodiment, the remote control device includes two antennas, and the aiming direction of the remote control device is determined to be a direction perpendicular to a straight line connecting the two antennas.

According to an example embodiment, a computer-readable recording medium stores a program which, when executed, controls an electronic device to perform determining relative position information of a remote control device to the electronic device; based on the relative position information, yaw angle information of the electronic device, and yaw angle information of the remote control device, calculating coordinates of the remote control device and a yaw angle of an aiming direction of the remote control device in a global coordinate system based on the electronic device; and based on the coordinates of the remote control device and the yaw angle of the aiming direction of the remote control device, determining a target device to be controlled by the remote control device.

According to an example embodiment, the determining of the target device to be controlled includes determining the target device to be controlled, based on the coordinates of the remote control device in the global coordinate system, the yaw angle of the aiming direction of the remote control device, and a preregistered sensible region, and when the target device to be controlled has been determined, the program is configured to cause the electronic device to perform controlling the target device to be controlled by the remote control device.

Various example embodiments of the disclosure may provide an electronic device for obtaining information on an aiming direction of a remote control device by setting a global coordinate system based on a reference electronic device in an indoor environment.

Various example embodiments of the disclosure may provide an electronic device for controlling a target device by a remote control device without setting a separate space for identifying a position of the remote control device in an indoor environment.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1A:
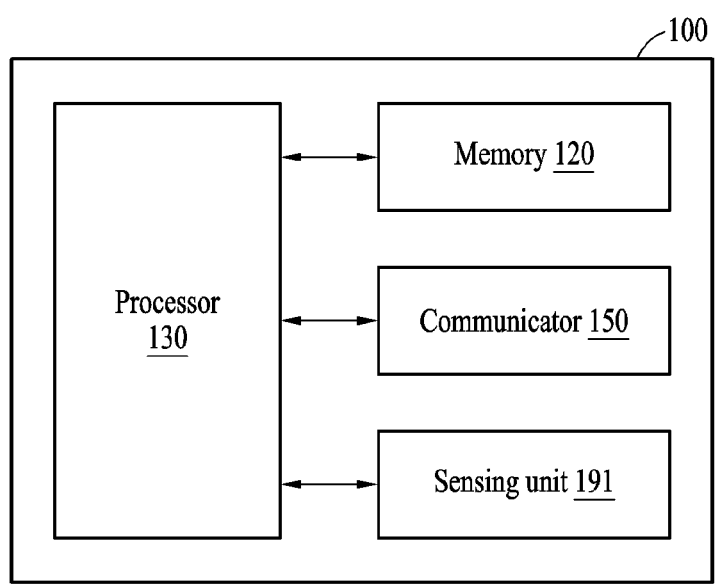
FIGS. 1A and 1B are block diagrams each illustrating an example reference electronic device according to various embodiments.

Hereinafter, various example embodiments will be described in greater detail with reference to the accompanying drawings. When describing the example embodiments with reference to the accompanying drawings, like reference numerals refer to like elements and a repeated description related thereto will not be repeated.

Reference Electronic Device

Figure 1B:
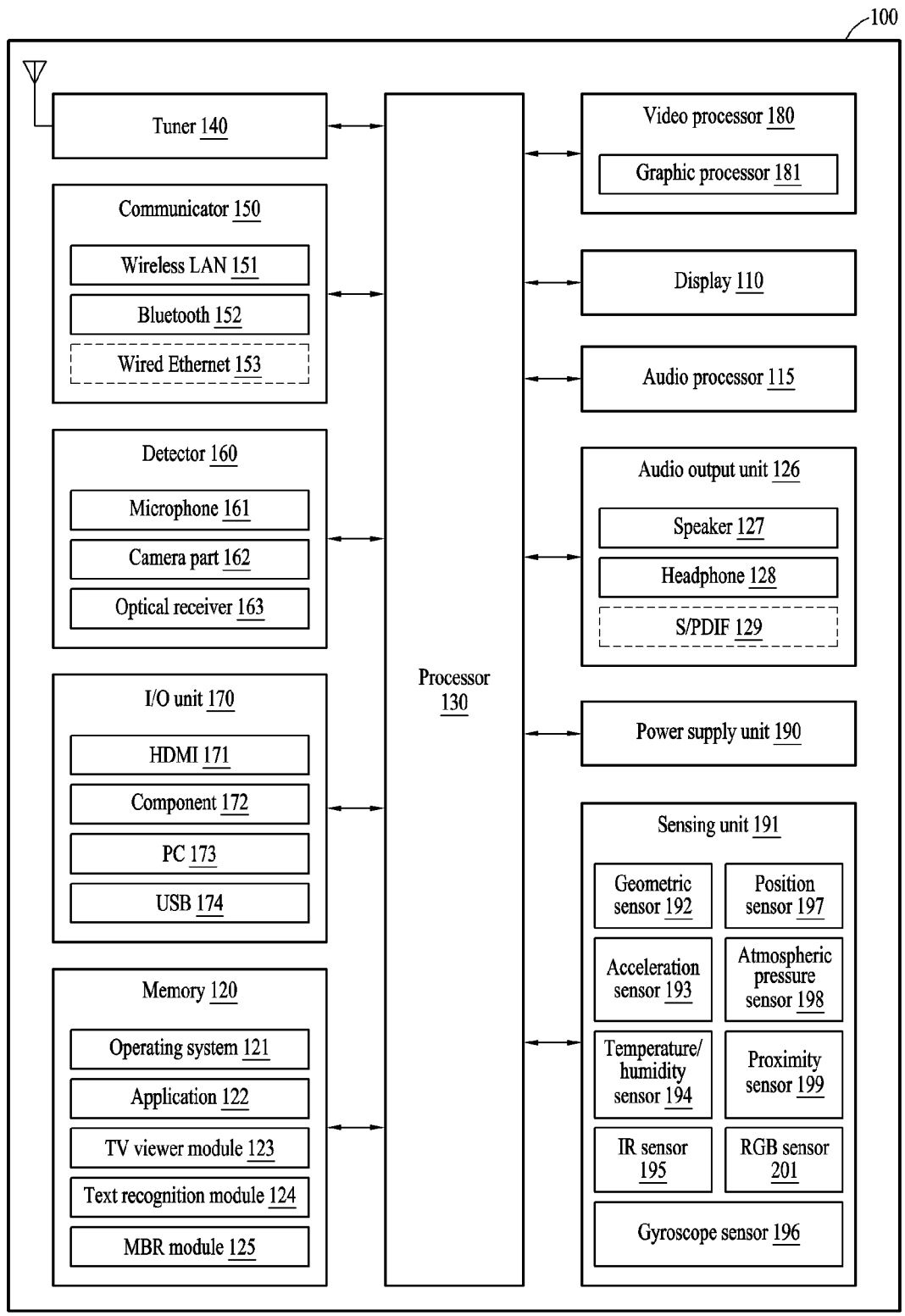

FIGS. 1A and 1B are block diagrams each illustrating an example reference electronic device according to various embodiments.

As illustrated in FIG. 1A, a reference electronic device 100 may include a memory 120, a processor 130 (e.g., including processing circuitry), a communicator 150 (e.g., including communication circuitry), and a sensing unit 191 (e.g., including one or more sensors). However, various embodiments need not all include all the illustrated components. The reference electronic device 100 may be implemented with more or fewer components than the illustrated components.

For example, as illustrated in FIG. 1B, the reference electronic device 100, besides the memory 120, the processor 130, the communicator 150, and the sensing unit 191, may further include a display 110, a tuner 140, a detector 160, an input/output (I/O) unit 170, a video processor 180, an audio processor 115, an audio output unit 126, and a power supply unit 190.

Hereinafter, the above-mentioned components are described.

The processor 130 may control the overall operation of the reference electronic device 100 and the signal flow between internal components of the reference electronic device 100, as well as process data. The processor 130 may execute various applications and an operation system (OS) stored in the memory 120, in response to a user input or when a preset and stored condition is satisfied.

The processor 130 may include random access memory (RAM) configured to store data or a signal input from outside the reference electronic device 100 or to be used as a storage corresponding to various tasks performed by the reference electronic device 100, read-only memory (ROM) configured to store a control program to control the reference electronic device 100, and a processor.

The processor 130 may include a graphics processing unit (GPU) (not shown) to process a graphic corresponding to a video. The processor 130 may be implemented as a System on Chip (SoC) that integrates a core (not shown) with the GPU (not shown). The processor 130 may include a single core, a dual core, a triple core, a quad core, and a multi core.

The processor 130 may include a plurality of processors. For example, the processor 130 may be implemented as a main processor (not shown) and a sub-processor (not shown) that operates in a sleep mode.

The processor 130, by executing one or more instructions stored in the memory 120, may detect at least one sensed value respectively corresponding to at least one sensor through the sensing unit 191, which includes at least one sensor.

In addition, the processor 130, by executing the one or more instructions stored in the memory 120, in response to determining that at least one sensed value is greater than or equal to a preset threshold, may determine that a remote control device 200 has touched the reference electronic device 100.

In addition, the processor 130, by executing the one or more instructions stored in the memory 120 and by comparing the at least one sensed value with a sensed value of the remote control device 200, received from the remote control device 200, may determine that the remote control device 200 has touched the reference electronic device 100.

In addition, the processor 130, by executing the one or more instructions stored in the memory 120, may request and receive identification information of the remote control device 200. In addition, the processor 130, based on the identification information of the remote control device 200, may confirm that the remote control device 200 is a device preregistered in the reference electronic device 100.

In addition, the processor 130, by executing the one or more instructions stored in the memory 120, based on the at least one sensed value, may determine a touch region in the reference electronic device 100 which the remote control device 200 touches.

In addition, the processor 130, by executing the one or more instructions stored in the memory 120, may compare at least one sensed value respectively corresponding to at least one sensor to another sensed value, and based on a comparison result, may determine one or more sensors that are determined to be close to a point where the remote control device 200 touches the reference electronic device 100. In addition, the processor 130, based on the determined one or more sensors, may determine a touch region.

In addition, the processor 130, may receive, through the communicator 150 from the remote control device 200, state information on an operation being currently executed by the remote control device 200.

In addition, the processor 130, by executing the one or more instructions stored in the memory 120, based on the received state information on the remote control device 200, may perform a preset function corresponding to the determined touch region.

In addition, the processor 130, by executing the one or more instructions stored in the memory 120, based on the at least one sensed value, may determine the number of times the remote control device 200 touches the reference electronic device 100.

In addition, the processor 130, by executing the one or more instructions stored in the memory 120, may perform a preset function corresponding to the number of touches.

In addition, the processor 130, by executing the one or more instructions stored in the memory 120, based on a user input, may preset a function corresponding to at least one touch region in the reference electronic device 100.

In addition, the processor 130, by executing the one or more instructions stored in the memory 120, based on the user input, may preset a function corresponding to the number of touches performed on the at least one touch region in the reference electronic device 100.

The memory 120 may store various pieces of data, programs, or applications for driving and controlling the reference electronic device 100 under control by the processor 130. The memory 120 may store I/O signals or pieces of data each corresponding to the driving of the video processor 180, the display 110, the audio processor 115, the audio output unit 126, the power supply unit 190, the tuner 140, the communicator 150, the detector 160, and the I/O unit 170.

The memory 120 may store an operating system 121 for controlling the reference electronic device 100 and the processor 130, an application 122 initially provided by a manufacturer or externally downloaded, a graphical user interface (GUI) related to the application 122, an object (e.g., an image text, an icon, a button, etc.) for providing the GUI, user information, a document, a database, and related data.

In addition, the memory 120 may include a television (TV) viewer module 123 including one or more instructions to receive an input signal from the remote control device 200 and thus perform channel control corresponding to the input signal or enter a channel scroll user interface mode when the input signal corresponds to a preset input, a text recognition module 124 including one or more instructions to recognize information from content received from an external device (not shown), and a membrane bioreactor (MBR) module 125 including one or more instructions to control a channel from an external device (not shown).

The memory 120 may include ROM, RAM, or a memory card (e.g., a micro secure digital (SD) card (not shown) and a universal serial bus (USB) memory (not shown)) included in the reference electronic device 100. In addition, the memory 120 may include a non-volatile memory, a volatile memory, a hard disk drive (HDD), or a solid state drive (SSD).

The memory 120 may include at least one type of a storage medium among a flash memory type, a hard disk type, a multimedia card micro type, a card memory type (e.g., SD or extreme digital (XE) memory), RAM, static RAM (SRAM), ROM, electrically erasable programmable ROM (EEPROM), programmable ROM (PROM), magnetic memory, a magnetic disk, and an optical disk.

The display 110 may display a video included in a broadcast signal received through the tuner 140 on a screen, under control by the processor 130. In addition, the display 110 may display content (e.g., a moving image) input through the communicator 150 or the I/O unit 170. The display 110 may output an image stored in the memory 120 under control of the processor 130.

The display 110 may generate a driving signal by converting an image signal, a data signal, an on-screen display (OSD) signal, and/or a control signal processed by the processor 130. The display 110 may be implemented as a plasma display panel (PDP), a liquid crystal display (LCD), an organic light-emitting diode (OLED) display, a cathode ray tube (CRT) display, and a flexible display, and, in addition, the display 110 may be implemented as a three-dimensional (3D) display. In addition, the display 110 may be used as an input device, besides an output device, by being configured into a touchscreen.

The tuner 140 may tune and select a frequency of a channel desired to be received by the reference electronic device 100 among various radio wave elements by performing amplification, mixing, and resonance on a broadcast signal received by wire or wirelessly. The broadcast signal may include audio, video, and additional information (e.g., an electronic program guide (EPG)).

The tuner 140 may receive the broadcast signal from a frequency band corresponding to a channel number, based on a user input (e.g., a control signal received from the remote control device 200, such as a channel number input, a channel up-down input, and a channel input to an EPG screen).

The tuner 140 may receive the broadcast signal from various sources, such as terrestrial broadcast, cable broadcast, satellite broadcast, and Internet broadcast. The tuner 140 may receive the broadcast signal from a source, such as analog broadcast or digital broadcast. The broadcast signal received by the tuner 140 may be separated into audio, video, and/or additional information through decoding (e.g., audio decoding, video decoding, or additional information decoding). The separated audio, video, and/or additional information may be stored in the memory 120 under control by the processor 130.

The number of tuners (e.g., the tuners 140) of the reference electronic device 100 may be one or more. The tuner 140 may be implemented as all-in-one with the reference electronic device 100 or implemented as a separate device (e.g., a set-top box (not shown) and a tuner (not shown) connected to the I/O unit 170) that includes a tuner electrically connected to the reference electronic device 100.

The communicator 150 may connect the reference electronic device 100 to an external device (e.g., an audio device) (not shown) under control of the processor 130. The processor 130 may transmit/receive content to/from the external device (not shown) connected through the communicator 150, may download an application from the external device (not shown), or may browse the web. The communicator 150 may include one of a wireless local area network (LAN) module 151, a Bluetooth module 152, and a wired Ethernet module 153 corresponding to the performance and the structure of the reference electronic device 100. In addition, the communicator 150 may include a combination of the wireless LAN 151, Bluetooth 152, and the wired Ethernet 153.

In addition, the communicator 150 may receive a control signal of the remote control device 200 under control of the processor 130. The control signal may be implemented as a Bluetooth type, a radio frequency (RF) signal type, or a Wi-Fi type.

In addition, the communicator 150 may further perform another form of short-range communication (e.g., near field communication (NFC) (not shown), Bluetooth low energy (BLE) (not shown), and Ultra-wideband (UWB) communication), besides Bluetooth communication.

The communicator 150 may include an antenna for performing communication. For example, the reference electronic device 100 may include a UWB antenna for performing UWB communication. The communicator 150 of the reference electronic device 100 may include one or more antennas, according to various example embodiments.

The detector 160 may detect a voice, an image, or an interaction of a user and may include a microphone 161, a camera part 162 (e.g., including one or more cameras), and an optical receiver 163.

The microphone 161 may receive a voice of the user. The microphone 161 may convert the received voice into an electrical signal and output the electrical signal to the processor 130. The voice of the user may include, for example, a voice corresponding to a menu or a function of the reference electronic device 100.

The camera part 162 may obtain an image, such as a still image or a moving image. An image captured by an image sensor may be processed by the processor 130 or by a separate image processor (not shown).

The image(s) processed by the camera part 162 may be stored in the memory 120 or may be transmitted to the outside through the communicator 150. The number of camera parts (e.g., the camera parts 162) may be two or more based on a configuration of the reference electronic device 110.

The optical receiver 163 may receive an optical signal (including a control signal) received from an external remote control device (e.g., the remote control device 200). The optical receiver 163 may receive an optical signal corresponding to a user input (e.g., a touch, a press, a touch gesture, a voice, or a motion) from the remote control device 200. A control signal may be extracted from the received optical signal under control of the processor 130. For example, the optical receiver 163 may receive, from the remote control device 200, a control signal corresponding to a channel up/down button for changing a channel The I/O unit 170 may receive a video (e.g., a moving image), audio (e.g., a voice, music, etc.), and additional information (e.g., an EPG, etc.) from outside the reference electronic device 100 under control of the processor 130. The I/O unit 170 may include at least one of a high-definition multimedia interface (HDMI) port 171, a component jack 172, a PC port 173, or a USB port 174, or combinations thereof. The I/O unit 170 may include at least any combination of the HDMI port 171, the component jack 172, the PC port 173, or the USB port 174. An external image providing device (not shown) may be connected through the HDMI port 171.

The video processor 180 may process video data received by the reference electronic device 100. In the video processor 180, various image processing, such as decoding, scaling, noise filtering, rate conversion, and resolution conversion, may be performed on the video data.

A graphics processor 181 may generate a screen including various objects, such as an icon, an image, and text using an arithmetic unit (not shown) and a renderer (not shown). The arithmetic unit (not shown) may calculate an attribute value, such as a color, a size, a shape, and a coordinate value, for each object to be displayed based on a layout of a screen using a user input that is detected by the detector 160. The renderer (not shown) may generate screens in various layouts including an object, based on the attribute value calculated by the arithmetic unit (not shown). The screens generated by the renderer (not shown) may be displayed on a display region of the display 110.

The audio processor 115 may process audio data. The audio processor 115 may perform various processing, such as decoding, amplification, and noise filtering, on the audio data. In addition, the audio processor 115 may include a plurality of audio processing modules to process pieces of audio respectively corresponding to contents.

The audio output unit 126 may output audio included in the broadcast signal received through the tuner 140 under control of the processor 130. The audio output unit 126 may output audio (e.g., a voice and sound) input through the communicator 150 or the I/O unit 170. In addition, the audio output unit 126 may output audio stored in the memory 120 under control of the processor 130. The audio output unit 126 may include at least one of a speaker 127, a headphones output terminal 128, or a Sony/Philips digital interface (S/PDIF) output terminal 129, or combinations thereof. The audio output unit 126 may include at least any combination of the speaker 127, the headphones output terminal 128, or the S/PDIF output terminal 129.

The power supply unit 190 may supply power input from an external power source to components in the reference electronic device 100 under control of the processor 130. In addition, the power supply unit 190 may supply power output from one or more batteries (not shown) included in the reference electronic device 100 to the components in the reference electronic device 100, under control of the processor 130.

The sensing unit 191 may sense a state of the reference electronic device 100 or a state around the reference electronic device 100 and provide sensed information to the processor 130.

The sensing unit 191 may include at least one of a geomagnetic sensor 192, an acceleration sensor 193, a temperature/humidity sensor 194, an infrared (IR) sensor 195, a gyroscope sensor 196, a position sensor (e.g., a global positioning system (GPS)) 197, an atmospheric pressure sensor 198, a proximity sensor 199, or a red, green, and blue (RGB) sensor 201 (e.g., an illuminance sensor), or combinations thereof, but the included sensors are not limited to those shown in FIG. 1B.

The sensing unit 191 may include a Hall sensor (not shown), according to an example embodiment. The Hall sensor may be a transducer that generates an electrical signal (e.g., voltage) in response to a magnetic field. The Hall sensor may generate an electrical signal of relatively high intensity when the intensity of the magnetic field is high and may generate an electrical signal of relatively low intensity when the intensity of the magnetic field is low. The processor 130 may receive the electrical signal from the Hall sensor after the magnetic field is sensed.

The sensing unit 191 may include an electronic compass (e-compass) or a flux gate compass that may sense an angle of the reference electronic device 100 using the geomagnetic sensor 192, the acceleration sensor 193, and the Hall sensor. For example, the geomagnetic sensor 192 may measure a bearing using a magnetic field and a line of magnetic force, and the Hall sensor may measure the angle of the reference electronic device 100 by sensing the intensity of the magnetic field.

The processor 130, through motion data obtained by the sensing unit 191, may measure a yaw angle value, a pitch angle value, and a roll angle value of the reference electronic device 100. The motion data may include three-axis motion data x1, y1, and z1 obtained by the acceleration sensor 193 or nine-axis motion data obtained by additionally using the gyroscope sensor 196 and the geomagnetic sensor 192.

The processor 130 may obtain information on a yaw angle value, a pitch angle value, and/or a roll angle value that are measured from the nine-axis motion data.

The sensing unit 191 may sense an external impact or touch applied to the reference electronic device 100. For example, when the remote control device 200 touches the reference electronic device 100, the sensing unit 191 of the reference electronic device 100 may output a sensed value.

In an embodiment, the reference electronic device 100 including the display 110 may be electrically connected to a separate external device (e.g., a set-top box (not shown)) including the tuner 140.

In various embodiments, the reference electronic device 100 may be implemented as an analog TV, a digital TV, a 3D-TV, a smart TV, an LED TV, an OLED TV, a plasma TV, and a monitor. However, one skilled in the art will understand that the reference electronic device is not limited to these examples.

Moreover, the illustrated block diagram of the reference electronic device 100 is a block diagram for an example embodiment. Each component of the block diagram may be integrated, added, or omitted based on actually implemented specifications of the reference electronic device 100. That is, two or more components may be combined into one component, or one component may be divided into two or more components, as necessary. In addition, a function performed by each block is for describing example embodiments, and a detailed operation thereof or a device does not limit the scope of the present disclosure.

Remote Control Device

Figure 2A:
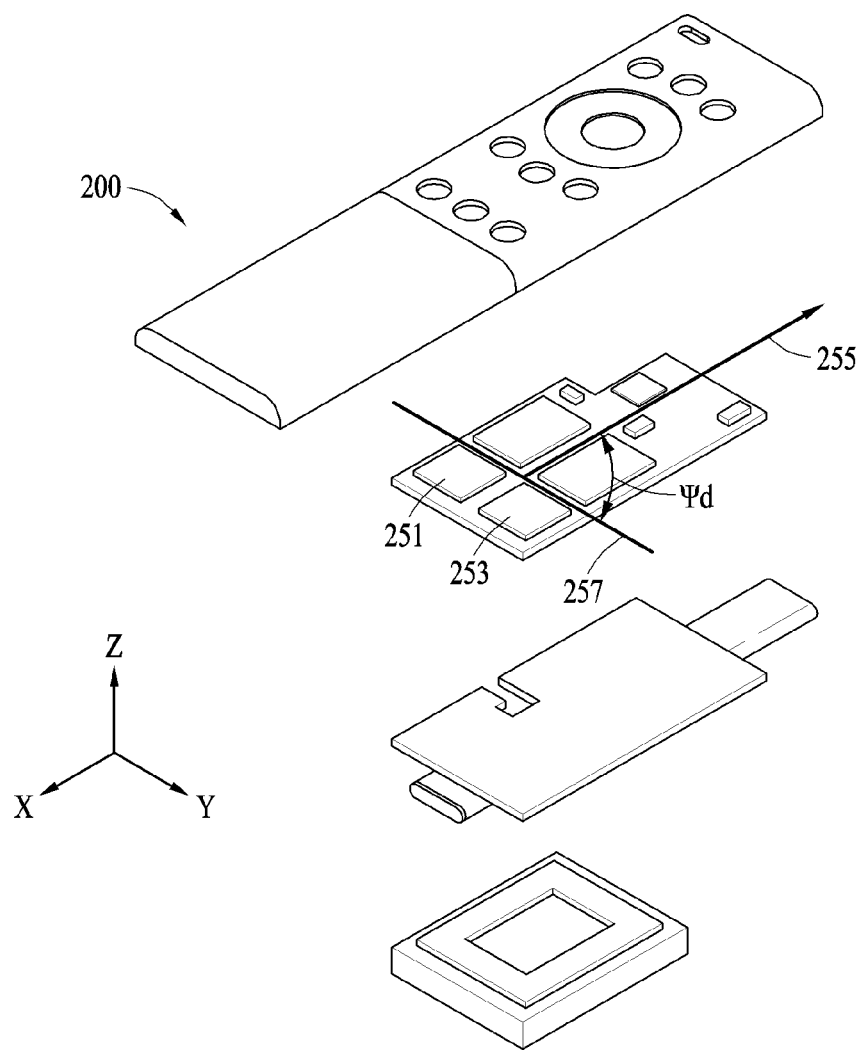
FIGS. 2A and 2B are diagrams each illustrating an example remote control device according to various embodiments.
Figure 2B:
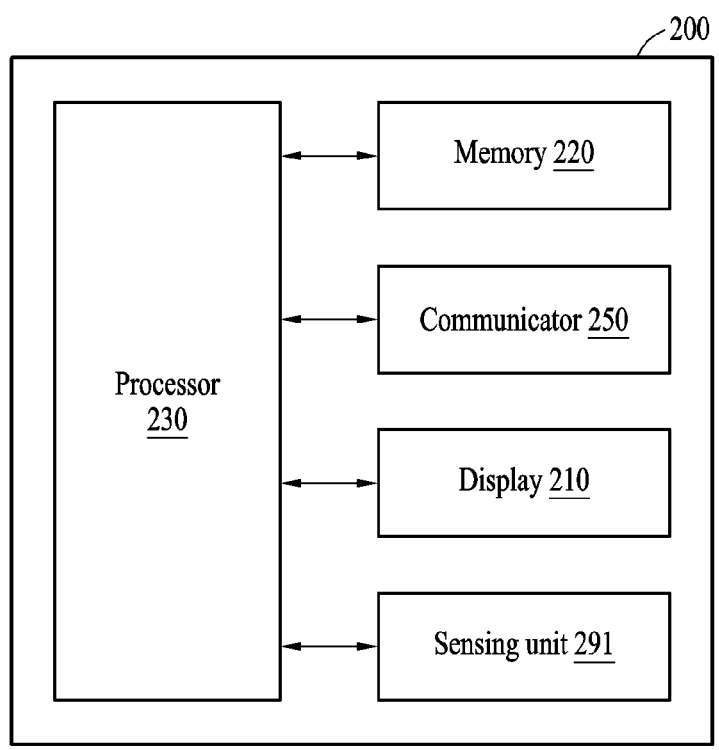

FIGS. 2A and 2B are diagrams each illustrating an example remote control device, according to various embodiments.

Referring to FIG. 2A, a configuration of an example remote control device 200 is illustrated according to various embodiments. The remote control device 200 may include a plurality of antennas (e.g., a first antenna 251 and a second antenna 253) for performing communication (e.g., UWB communication) with a reference electronic device 100.

An aiming direction 255 of the remote control device 200 may be determined based on the first antenna 251 and the second antenna 253. When an indoor environment in which the reference electronic device 100 and the remote control device 200 operate is viewed from above, the indoor environment may be expressed as a plane (e.g., an X-Y plane viewed from a +Z axis), and the aiming direction 255 of the remote control device 200 may be determined to be a direction on the plane.

The aiming direction 255 of the remote control device 200 may be determined to be a direction perpendicular to a straight line 257 corresponding to the first antenna 251 and the second antenna 253, but is not limited thereto and may be a direction at an angle $\psi_d$ to the straight line 257. The angle $\psi_d$ may be about 90°.

Referring to FIG. 2B, a block diagram of an example remote control device 200 is illustrated according to various embodiments. The remote control device 200 may include at least some of the components of the reference electronic device 100 illustrated in FIGS. 1A and 1B.

As illustrated in FIG. 2B, the remote control device 200 may include a display 210, a memory 220, a communicator 250 (e.g., including communication circuitry), a sensing unit 291 (e.g., including one or more sensors), and a processor 230 (e.g., including processing circuitry). However, the remote control device 200 need not include all the components illustrated in FIG. 2B. The remote control device 200 may be implemented with more or fewer components than the components illustrated in FIG. 2B.

The display 210 of the remote control device 200 may generate a driving signal by converting an image signal, a data signal, an OSD signal, and/or a control signal processed by the processor 230.

In addition, the display 210 may display content (e.g., a moving image) input through the communicator 250 or an I/O unit (not shown). The display 210 may output an image stored in the memory 220 under control of the processor 230.

The memory 220 of the remote control device 200 may store a program for processing and controlling the processor 230 and store data input to or output from the remote control device 200.

The processor 230 may control the overall operation of the remote control device 200. For example, the processor 230 may generally control the sensing unit 291, the communicator 250, and the like by executing programs stored in the memory 220. The processor 230 may control an operation of the remote control device 200, which will be described with reference to FIGS. 3 through 10.

The processor 230 may include one or more processors. The one or more processors may include a general-purpose processor, such as a central processing unit (CPU), an application processor (AP), or a digital signal processor (DSP), or a graphics processor, such as a GPU or a vision processing unit (VPU). The one or more processors may control input data to be processed according to a predefined operation rule stored in the memory 220.

The processor 230 may receive a wireless signal transmitted by the reference electronic device 100 through the communicator 250.

In addition, the processor 230 may receive a request for identification information of the remote control device 200 from the reference electronic device 100 through the communicator 250. The processor 230 may control the identification information of the remote control device 200 to be transmitted to the reference electronic device 100 through the communicator 250.

In addition, the processor 230 may control a value sensed by the sensing unit 250 to be transmitted to the reference electronic device 100 through the communicator 250.

In addition, the processor 230 may receive a request for state information on an operation being currently executed by the remote control device 200 through the communicator 250. The processor 230 may generate the state information on the currently executed operation. In addition, the processor 230 may control the state information on the currently executed operation to be transmitted to the reference electronic device 100 through the communicator 250.

In addition, the memory 220 may include at least one type of a storage medium among a flash memory type, a hard disk type, a multimedia card micro type, a card type memory (e.g., SD or XE memory), RAM, SRAM, ROM, EEPROM, PROM, magnetic memory, a magnetic disk, and an optical disk.

In addition, the communicator 250 may include one or more components that allow the remote control device 200 to communicate with an external device. For example, the communicator 250 may include a short-range wireless communicator (not shown), a mobile communicator (not shown), and a broadcast receiver (not shown).

The short-range wireless communicator may include a Bluetooth communicator, a BLE communicator, a near field communicator, a WLAN (or Wi-Fi) communicator, a Zigbee communicator, an infrared data association (IrDA) communicator, a Wi-Fi direct (WFD) communicator, a UWB communicator, and an Ant+communicator, but the communicators are not limited to these examples.

The communicator 250 may include an antenna for performing communication. For example, the remote control device 200 may include a UWB antenna for performing UWB communication. The communicator 250 of the remote control device 200 may include one or more antennas.

The mobile communicator may transmit and receive a wireless signal to and from at least one of a base station, an external terminal, or a server, or combinations thereof in a mobile communication network. In this case, the wireless signal may include various types of data, based on transmission and reception of a voice call signal, a video communication call signal, or a text or multimedia message.

The broadcast receiver may receive a broadcast signal and/or information on one or more broadcasts from an external device through a broadcast channel. The broadcast channel may include a satellite channel and a terrestrial channel According to various embodiments, the remote control device 200 need not include the broadcast receiver.

The sensing unit 291 may sense a state of the remote control device 200 or a state around the remote control device 200 and transmit sensed information to the processor 230.

The sensing unit 291 may include at least one of a geomagnetic sensor, an acceleration sensor, a temperature/humidity sensor, an IR sensor, a gyroscope sensor, a position sensor (e.g., a GPS), a light sensor, a proximity sensor, or an RGB sensor (e.g., an illuminance sensor), or combinations thereof but the sensors included in the sensing unit are not limited to these examples. The sensing unit 291 may correspond to the sensing unit 191 described with reference to FIG. 1B, and a description thereof is not repeated here. As described with reference to FIG. 1B, the processor 230, through the sensing unit 291, may obtain information on a yaw angle, a pitch angle, and/or a roll angle that are measured from nine-axis motion data.

The sensing unit 291 may sense an external impact or touch applied to the remote control device 200. The acceleration sensor included in the remote control device 200 may sense an impact caused, for example, by touching by the reference electronic device 100. In addition, the acceleration sensor included in the remote control device 200 may sense the moving speed and acceleration of the remote control device 200.

For additional descriptions of the display 210, the memory 220, the communicator 250, the sensing unit 291, and the processor 230 of the remote control device 200, reference may be made to the descriptions of the display 110, the memory 120, the communicator 150, the sensing unit 191, and the processor 130 of the reference electronic device 100 provided with reference to FIGS. 1A and 1B.

Figure 3:
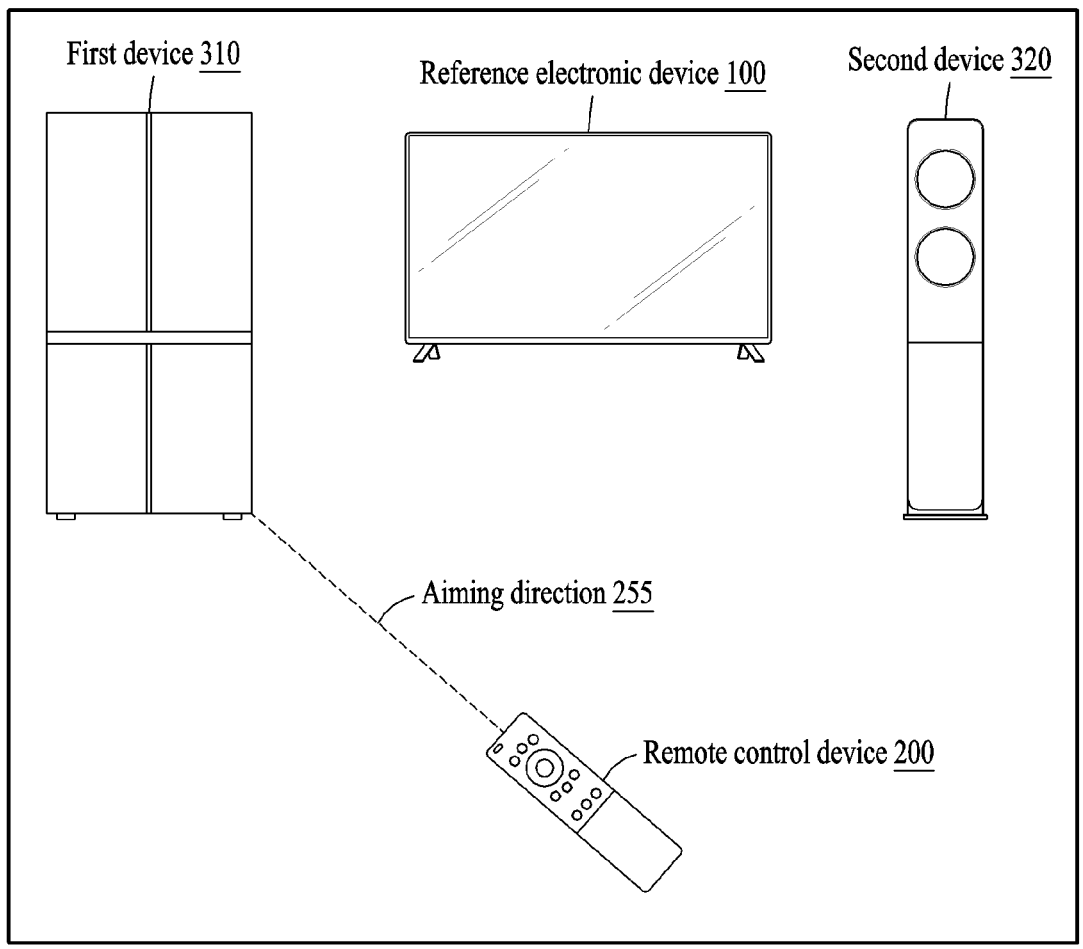
FIG. 3 is a diagram illustrating an example indoor environment in which a reference electronic device, one or more devices, and a remote control device for controlling the devices are positioned, according to various embodiments.

FIG. 3 is a diagram illustrating an example indoor environment in which a reference electronic device, one or more devices, and a remote control device for controlling the devices are positioned, according to various embodiments.

Operations to be described with reference to FIGS. 3 through 8 may be performed by the processor 230 of the remote control device 200 and/or the processor 130 of the reference electronic device 100. Alternatively, related data may be transmitted to an external server through the reference electronic device 100, and the certain operations may be performed by the external server.

Referring to FIG. 3, the indoor environment may include the reference electronic device 100 (e.g., a TV), the remote control device 200, a first device 310 (e.g., a refrigerator), and a second device 320 (e.g., an air conditioner). As described with reference to FIG. 2B, the remote control device 200 may communicate with the reference electronic device 100, the first device 310, and the second device 320, and a user may control the reference electronic device 100, the first device 310, and the second device 320 using the remote control device 200.

The remote control device 200 may perform Bluetooth communication, BLE communication, near field communication, Wi-Fi communication, Zigbee communication, IrDA communication, WFD communication, and the like with one or more devices (e.g., the first device 310 and the second device 320).

The reference electronic device 100 may perform UWB communication with the remote control device 200, and based on the UWB communication, may set a virtual coordinate system in the indoor environment and determine the aiming direction 255 of the remote control device 200 in the virtual coordinate system. An example method of setting a virtual coordinate system and a method of determining an aiming direction, according to various example embodiments will be described with reference to FIGS. 5A, 5B, 5C, 6A, and 6B.

A coordinate system may be set to two dimensions (2D) or three dimensions (3D), based on an antenna included in the reference electronic device 100 and the remote control device 200. An antenna corresponding to a position of the reference electronic device 100, for setting the coordinate system, may be implemented in a device different from the reference electronic device 100. For example, the antenna corresponding to the position of the reference electronic device 100 may be included in a different electronic device, and the different electronic device may be attached to or disposed on the reference electronic device 100.

When the coordinate system is set to a 2D coordinate system, as described with reference to FIG. 2A, the indoor environment may be expressed as a plane (e.g., an X-Y plane viewed from a +Z axis), a position of each device (e.g., the reference electronic device 100, the remote control device 200, the first device 310, and the second device 320) may be determined to be a point, a line, or a region in the coordinate system, and the aiming direction 255 of the remote control device 200 may be determined to be one direction in the coordinate system.

The setting of the coordinate system may be performed by the processor 130 of the reference electronic device 100 and/or the processor 230 of the remote control device 200. Through UWB communication between the reference electronic device 100 and the remote control device 200, information on an angle may be measured by a method, such as an angle of arrival (AoA), a time of flight (TOF), or a time difference of arrival (TDoA), information on a distance or the angle may be transmitted to an external server, and a coordinate system may be set by the external server. Information on the set coordinate system may be stored in the memory 120 of the reference electronic device 100 and/or the memory 230 of the remote control device 200 or may be stored in an external server and transmitted upon request by the processor 130 of the reference electronic device 100 or the processor 230 of the remote control device 200. A method of measuring a distance, based on UWB communication, according to various example embodiments, will be described with reference to FIG. 4.

Before controlling the first and second devices 310 and 320 using the remote control device 200, a user may register a virtual region sensible by the remote control device 200 in a coordinate system for each of the first and second devices 310 and 320. For example, through a user input through the remote control device 200, at a position of a device for which a sensible region is registered, a user may register the sensible region of the device in the coordinate system.

The processor 130 of the reference electronic device 100 may determine a target device to be controlled, based on a sensible region of each of the first and second devices 310 and 320 in the coordinate system, a position of the remote control device 200 in the coordinate system, and the aiming direction 255 of the remote control device 200.

A process of determining relative position information of the remote control device 200 to the reference electronic device 100 will be described with reference to FIGS. 5A, 5B, and 5C. A process of determining the aiming direction 255 of the remote control device 200 in a global coordinate system based on the reference electronic device 100 will be described with reference to FIGS. 6A and 6B.

Figure 4:
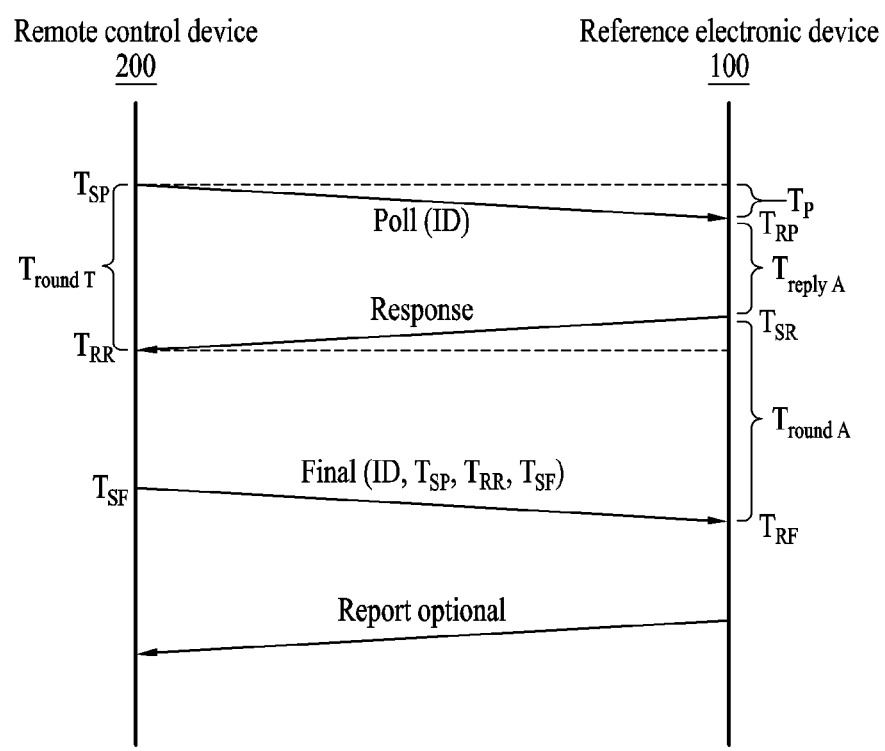
FIG. 4 is a diagram illustrating an example method of measuring a distance between a reference electronic device and a remote control device, according to various embodiments.

FIG. 4 is a diagram illustrating an example method of measuring a distance between a reference electronic device and a remote control device, according to various embodiments.

The reference electronic device 100 (or the processor 130 of the reference electronic device 100) may calculate a distance to an external electronic device through a UWB signal. As described with reference to FIG. 1B, the reference electronic device 100 may include a UWB antenna for performing UWB communication. The UWB antenna of the reference electronic device 100 may include at least one processor different from the processor 130, and based on the UWB signal, a distance to the external electronic device may be calculated. The at least one processor included in the UWB antenna may generate data or information including time information, based on the UWB signal, and the generated data or information may be provided to the processor 130. The processor 130 may calculate the distance to the external electronic device, based on the provided data or information.

A method, to be described below, of determining (e.g., calculating) a distance may be described based on the reference electronic device 100 or the processor 130 of the reference electronic device 100, but the method may also be performed by the at least one processor, different from the processor 130, of the UWB antenna.

The processor 130 of the reference electronic device 100 may use a method, such as an AoA, a ToA, and a TDoA, to calculate the distance to the external electronic device. A process of calculating a distance between the reference electronic device 100 and the remote control device 200, based on a ToA method, is described with reference to FIG. 4.

Referring to FIG. 4, the processor 130 of the reference electronic device 100 may calculate the distance between the reference electronic device 100 and the remote control device 200 using a two-way ranging (TWR) method in which the reference electronic device 100 and the remote control device 200 transmit and receive signals to and from each other. The remote control device 200 may be a UWB tag device, and the reference electronic device 100 may be a UWB anchor device.

The remote control device 200 may transmit a poll signal to the reference electronic device 100. The reference electronic device 100 which has received the poll signal may transmit a response signal to the remote control device 200. The remote control device 200 which has received the response signal may transmit a final signal to the reference electronic device 100. A round trip time (RTT) $T_{round}$ of a signal transmitted from the remote control device 200 may be measured through a time $T_{SP}$ when the poll signal is transmitted and a time $T_{RR}$ when the response signal is received. A reply delay time $T_{reply\ A}$ of the reference electronic device 100 may be measured through a time $T_{RP}$ when the poll signal is received and a time $T_{SR}$ when the response signal is transmitted. The reference electronic device 100 may transmit a $T_{RP}$ value and a $T_{SR}$ value together with the response signal, and accordingly, the remote control device 200 may calculate $T_{reply\ A}$ of the reference electronic device 100. An RTT $T_{round\ A}$ of a signal transmitted from the reference electronic device 100 may be measured through the time $T_{SR}$ when the response signal is transmitted and a time $T_{RF}$ when the final signal is received. A ToA TP of a signal between the remote control device 200 and the reference electronic device 100 may be calculated through Equation 1.

$$T_P = (T_{round\ T} - T_{reply\ A})/2 \quad \text{[Equation 1]}$$

The distance between the remote control device 200 and the reference electronic device 100 may be calculated using the ToA $T_p$ and a speed of the signal. In addition, the reference electronic device 100 may further transmit a report optional signal to the remote control device 200.

However, in addition to the UWB communication method described with reference to FIG. 4, a distance between a reference electronic device and a remote control device may be measured based on various communication methods. For example, the distance between the reference electronic device and the remote control device may be measured based on Bluetooth or Wi-Fi.

FIGS. 5A, 5B, 5C, 6A, and 6B are diagrams each illustrating aspects of an example process of setting a global coordinate system based on the reference electronic device 100 in an indoor environment (e.g., the indoor environment of FIG. 3). As described with respect to the aiming direction 255 of the remote control device 200 in FIG. 2A, FIGS. 5A, 5B, 5C, 6A, and 6B may also be based on an indoor environment in which the reference electronic device 100 and the remote control device 200 operate being viewed from above. For example, FIGS. 5A, 5B, 5C, 6A, and 6B may represent an X-Y plane that is an indoor environment viewed from a +Z axis.

Figure 5A:
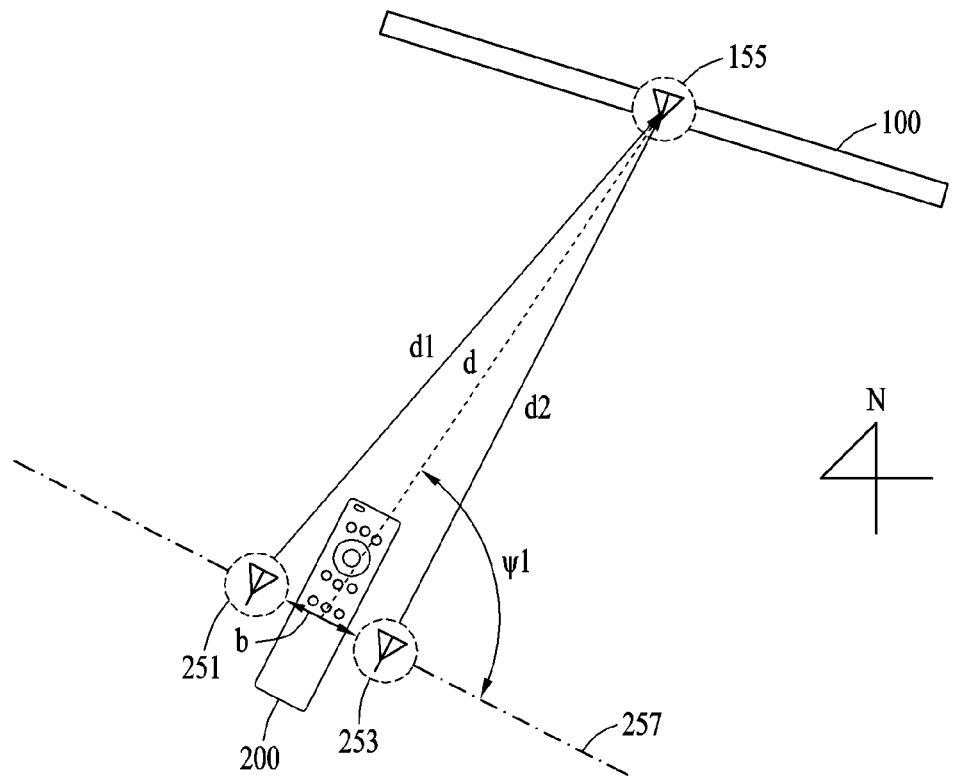
FIGS. 5A, 5B, and 5C are diagrams each illustrating an example operation of determining relative position information of a remote control device to a reference electronic device according to various embodiments.
Figure 5B:
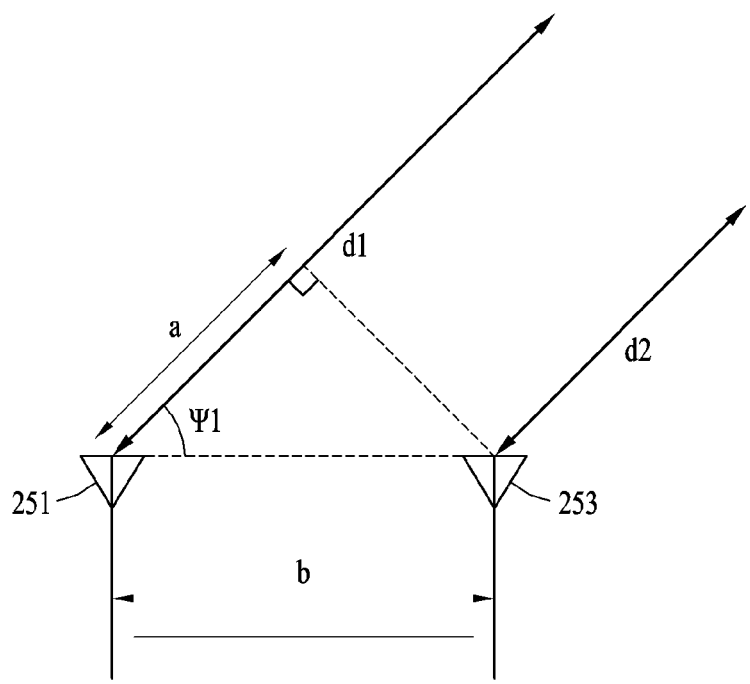
Figure 5C:
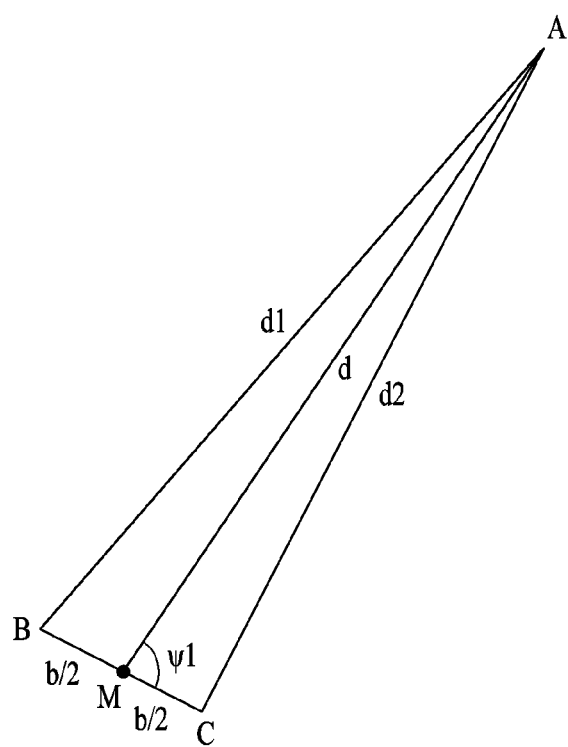

FIGS. 5A, 5B, and 5C are diagrams each illustrating aspects of an example operation of determining relative position information of a remote control device to a reference electronic device according to various embodiments.

Referring to FIG. 5A, the processor 130 of the reference electronic device 100 may determine relative position information of the remote control device 200 to the reference electronic device 100. The relative position information may include a distance d from the remote control device 200 to the reference electronic device 100, a direction from the remote control device 200 to the reference electronic device 100 (a dashed line corresponding to the distance d), and an angle $\psi_1$ generated relative to a direction (a direction of a straight line 257) based on positions of a plurality of antennas 251 and 253 of the remote control device 200.

As described with reference to FIG. 1B, the reference electronic device 100 may include a UWB antenna 155, and as described with reference to FIGS. 2A and 2B, the remote control device 200 may include UWB antennas 251 and 253. As described with reference to FIG. 4, information on a distance "b", a distance d1 and a distance d2 between the UWB antennas 155, 251, and 253 may be calculated. The information on the distance "b", the distance d1, and the distance d2 may be obtained from the processor 130 of the reference electronic device 130 or the processor 230 of the remote control device 200 and be transmitted to the reference electronic device 100.

Referring to FIG. 5B, the distance "d" and the angle yri may be determined based on the distance "b", the distance d1, and the distance d2. The distance d1 and the distance d2 are greater than the distance "b" by a threshold level or more, and thus, a straight line corresponding to the distance d1 and a straight line corresponding to the distance d2 may be construed to be parallel. Accordingly, a distance "a" may be "a"=d1−d2, and the distance "d" may be determined to be the same as the distance d1 or the distance d2. In addition, the angle $\psi_1$ may be determined using Equation 2.

$$\Psi_1 = \cos^{-1}\left(\frac{a}{b}\right) \quad \text{[Equation 2]}$$

Referring to FIG. 5C, in an embodiment, the distance d and the angle $\psi_1$ may be determined in a method different from the method of FIG. 5B. A triangle ABC of FIG. 5C illustrates a triangle including the UWB antennas 155, 251, and 253 of FIG. 5A, in which points A, B, and C each may respectively correspond to the UWB antennas 155, 251, and 253.

The relative position information of the remote control device 200 to the reference electronic device 100 may include the distance "d" and the angle $\psi_1$ that are based on a midpoint M between the UWB antennas 251 and 253. As described above, the processor 130 of the reference electronic device 100 may obtain information on lengths (e.g., the distances d1, "b", and d2) of three sides of the triangle ABC, and accordingly, information on an angle ∠C C of the triangle ABC may be calculated, for example, based on the law of cosines.

The processor 130 may also obtain information on lengths (e.g., a distance b/2 and the distance d2) of two sides of a triangle AMC, and based on the information on the lengths of the two sides of the triangle AMC and the information on the angle ∠C C, may calculate information on the angle $\psi_1$, for example, based on the law of cosines.

As described with reference to FIGS. 5A, 5B, and 5C, when the relative position information (e.g., the distance d and the angle $\psi_1$) of the remote control device 200 to the reference electronic device 100 is determined, the processor 130 may set a global coordinate system based on the reference electronic device 100. The setting of the global coordinate system based on the reference electronic device 100 will be described with reference to FIGS. 6A and 6B.

Figure 6A:
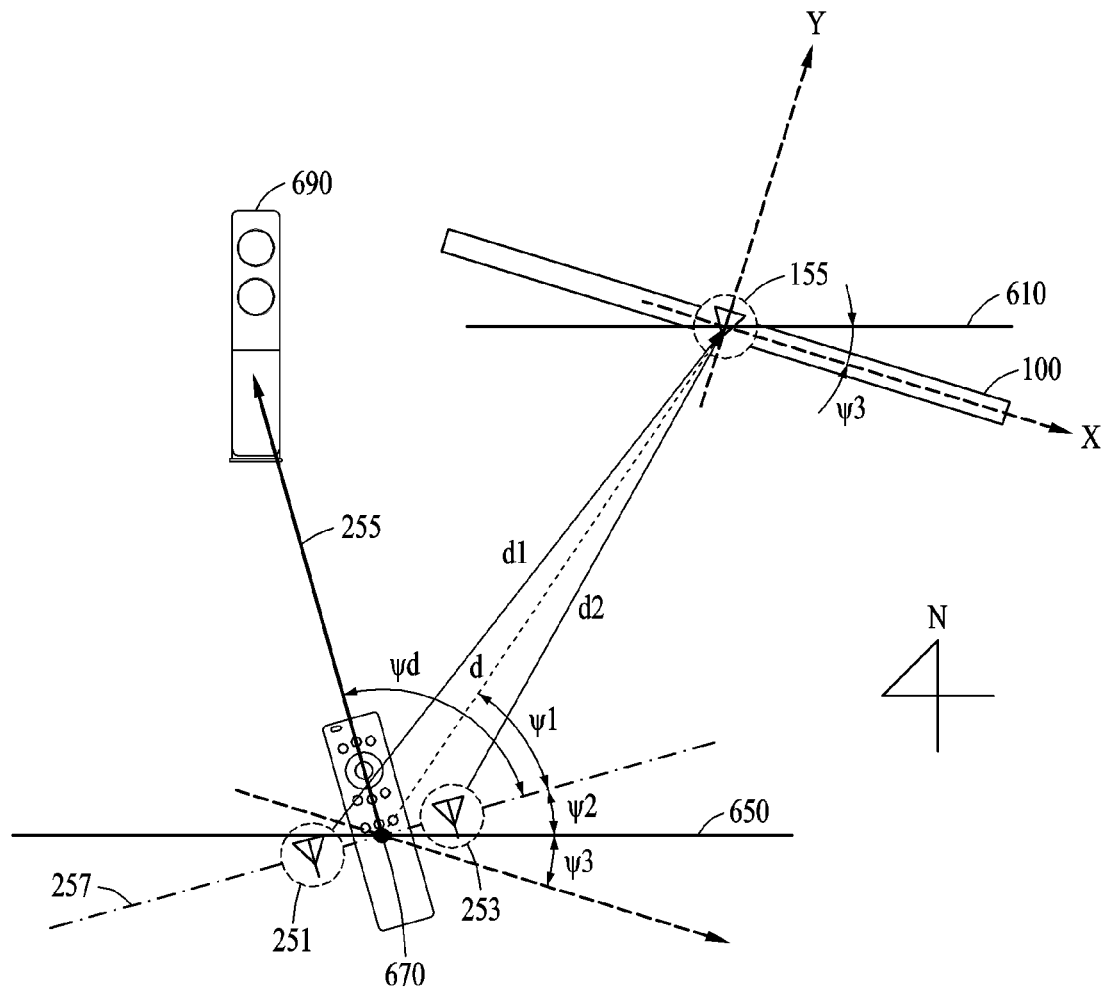
FIGS. 6A and 6B are diagrams each illustrating an example operation of determining an aiming direction of a remote control device in a global coordinate system based on a reference electronic device according to various embodiments.
Figure 6B:
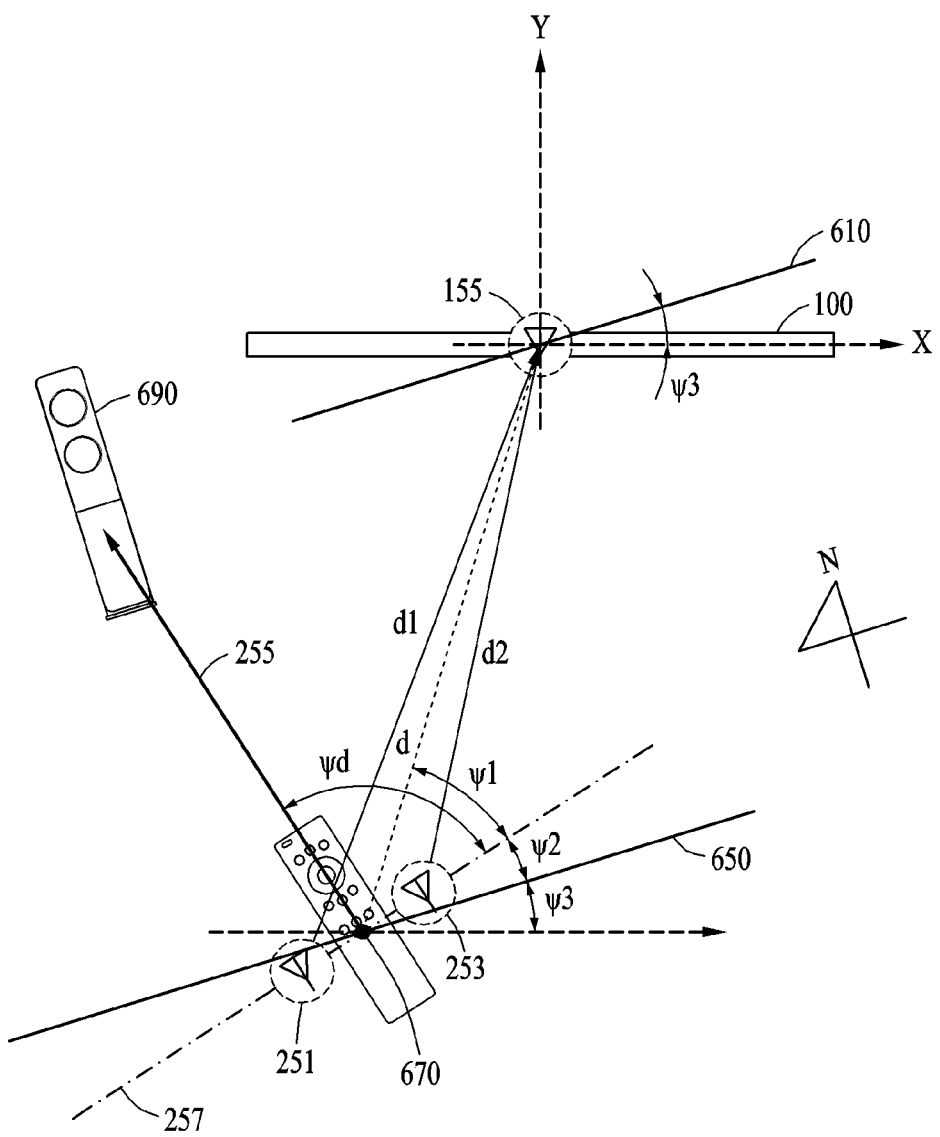

FIGS. 6A and 6B are diagrams each illustrating aspects of an example operation of determining an aiming direction of a remote control device in a global coordinate system based on a reference electronic device according to various embodiments.

Referring to FIG. 6A, illustrated is an indoor environment (e.g., the indoor environment of FIG. 3) in which the reference electronic device 100 and the remote control device 200 are positioned, based on magnetic north N in FIG. 6A, viewed from above.

The processor 130 of the reference electronic device 100 may obtain or calculate information on a distance d1, a distance d2, a distance "d", and an angle $\psi_1$ as described with reference to FIGS. 4 and 5A. As described with reference to FIG. 2A, an aiming direction 255 of the remote control device 200 is a direction at an angle $\psi_d$ to a straight line 257 corresponding to a plurality of antennas 251 and 253.

As described with reference to FIG. 1B, the processor 130, based on the sensing unit 191, may obtain information on a yaw angle $\psi_3$ of the reference electronic device 100 corresponding to a straight line 610 to a direction of magnetic north. As described with reference to FIG. 2B, the processor 230 of the remote control device 200, based on the sensing unit 291, may obtain information on a yaw angle $\psi_2$ of the remote control device 200 corresponding to a straight line 650 to the direction of the magnetic north. The processor 130 of the reference electronic device 100 may receive information on the yaw angle $\psi_2$ of the remote control device 200 from the remote control device 200.

FIG. 6B is a diagram rotating FIG. 6A, based on the reference electronic device 100, in an indoor environment (e.g., the indoor environment of FIG. 3), which may be a global coordinate system based on the reference electronic device 100. The processor 130 of the reference electronic device 100 may obtain information on coordinates 670 of the remote control device 200 in the global coordinate system based on the reference electronic device 100. For example, the coordinates 670 may be determined to be (-d×cos ($\psi_1+\psi_2+\psi_3$), -d×sin($\psi_1+\psi_2+\psi_3$)).

The processor 130 may calculate an angle of an aiming direction 255 of the remote control device 200 in the global coordinate system based on the reference electronic device 100. For example, the angle of the aiming direction 255 of the remote control device 200 in the global coordinate system based on the reference electronic device 100 may be $\psi_d+\psi_2+\psi_3$.

The angle of the aiming direction 255 of the remote control device 200 in the global coordinate system based on the reference electronic device 100 may be a yaw angle on the X-Y plane as described with reference to FIG. 2A. As described with reference to FIG. 2B, the processor 230 of the remote control device 200 may obtain information on a pitch angle value and/or a roll angle value of the remote control device 200 through the sensing unit 291 and transmit the obtained information to the reference electronic device 100. The processor 130 of the reference electronic device 100 may calibrate aiming information of the remote control device 200, based on the received information on the pitch angle and roll angle values of the remote control device 200.

The processor 120 of the reference electronic device 100 may determine a target device to be controlled, based on an angle between the coordinates 670 and the aiming direction 255 of the remote control device 200 in the global coordinate system.

As described with reference to FIG. 3, a sensible region, in a coordinate system, of devices (e.g., the first and second devices 310 and 320 of FIG. 3) in an indoor environment (e.g., the indoor environment of FIG. 3) may be preregistered. A sensing region 690 of devices in FIGS. 6A and 6B may be illustrated in a form of devices for ease of description, but the sensible region in the coordinate system may be registered in another form.

A device control input (e.g., power-on) through the remote control device 200 may be transmitted to the reference electronic device 100, and the processor 130 may calculate an angle of the aiming direction 255 of the remote control device 200 and information on a position (e.g., the coordinates 670), in the coordinate system, of the remote control device 200 at a time when the device control input is received as described with reference to FIGS. 5A, 5B, 5C, 6A, and 6B. The processor 130, based on the coordinates 670 and the angle, may determine, as a target device to be controlled, a device corresponding to an overlapping sensible region among preregistered sensible regions of devices (e.g., the first and second devices 310 and 320 of FIG. 3) in an indoor environment.

The processor 130 may control the target device to be controlled, based on a user input. For example, the processor 130 may turn on the target device to be controlled, based on a power-on input provided to the remote control device 200.

By setting a global coordinate system based on the reference electronic device 100 in an indoor environment, the user may control the target device through the remote control device 200 without separate space setting to identify a position of the remote control device 200.

Operating Method of Reference Electronic Device

Figure 7:
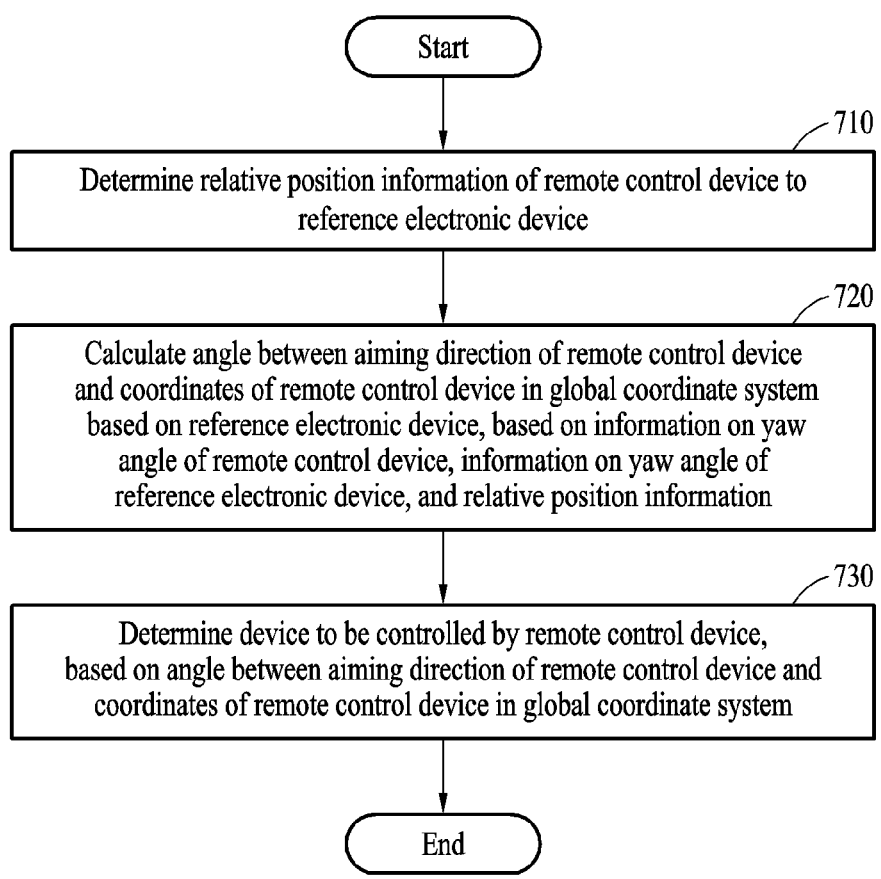
FIG. 7 is a flowchart illustrating an example operation of a reference electronic device, according to various embodiments.

FIG. 7 is a flowchart illustrating an example operation of a reference electronic device, according to various embodiments.

Operations (e.g., operations 710 through 730 and 810 through 830) to be described with reference to FIGS. 7 and 8 may be performed by the processor 130 of the reference electronic device 100 described above with reference to FIGS. 1A and 1B and/or by the processor 230 of the remote control device 200 described above with reference to FIGS. 2A and 2B. For ease of description, the operations will be described based on the processor 130 of the reference electronic device 100. The descriptions provided with reference to FIGS. 1A through 6B are not repeated here for brevity.

In operation 710, the processor 130 may determine relative position information of the remote control device 200 to the reference electronic device 100. As described with reference to FIGS. 5A, 5B, and 5C, the relative position information may include a distance "d" from the remote control device 200 to the reference electronic device 100, a direction from the remote control device 200 to the reference electronic device 100, and an angle $\psi_1$ generated in a direction based on positions of a plurality of antennas 251 and 253 of the remote control device 200. A method of determining relative position information of a remote control device to a reference electronic device will be described in detail with reference to FIG. 8.

In operation 720, the processor 130 may calculate an angle of an aiming direction of the remote control device 200 and coordinates of the remote control device 200 in a global coordinate system based on the reference electronic device 100, based on information on a yaw angle of the remote control device 200, information on a yaw angle of the reference electronic device 100, and the relative position information determined in operation 710.

As described with reference to FIG. 6A, the processor 130 may obtain information on a yaw angle $\psi_3$ of the reference electronic device 100 and information on a yaw angle $\psi_2$ of the remote control device 200.

As described with reference to FIG. 6B, the processor 130 may obtain information on the coordinates (e.g., the coordinates 670 of FIG. 6B) of the remote control device 200 in the global coordinate system based on the reference electronic device 100. For example, the coordinates may be determined to be $(d \times \cos(\psi_1+\psi_2+\psi_3), -d \times \sin((\psi_1+\psi_2+\psi_3))$ in a coordinate system using an antenna (e.g., the antenna 155 of FIG. 6B) of the reference electronic device 100 as an origin. As described with reference to FIG. 6B, the processor 130 may calculate an angle of an aiming direction 255 of the remote control device 200 in the global coordinate system based on the reference electronic device 100. For example, the angle of the aiming direction 255 of the remote control device 200 in the global coordinate system based on the reference electronic device 100 may be $(\psi_1+\psi_2+\psi_3)$.

In operation 730, the processor 130 may determine a target device to be controlled by the remote control device 200, based on the coordinates of the remote control device 200 in the global coordinate system and the angle of the aiming direction 255 of the remote control device 200.

As described with reference to FIG. 6B, a device control input (e.g., power-on) through the remote control device 200 may be transmitted to the reference electronic device 100, and the processor 130 may calculate the angle of the aiming direction 255 of the remote control device 200 and information on the coordinates of the remote control device 200 in the coordinate system at a time when the device control input is received. The processor 130, based on the coordinates and the angle, may determine, as a target device to be controlled, a device corresponding to an overlapping sensible region among preregistered sensible regions of devices (e.g., the first and second devices 310 and 320 of FIG. 3) in an indoor environment.

The processor 130 may control the target device, based on a user input. For example, the processor 130 may turn on the target device to be controlled, based on a power-on input provided to the remote control device 200.

Figure 8:
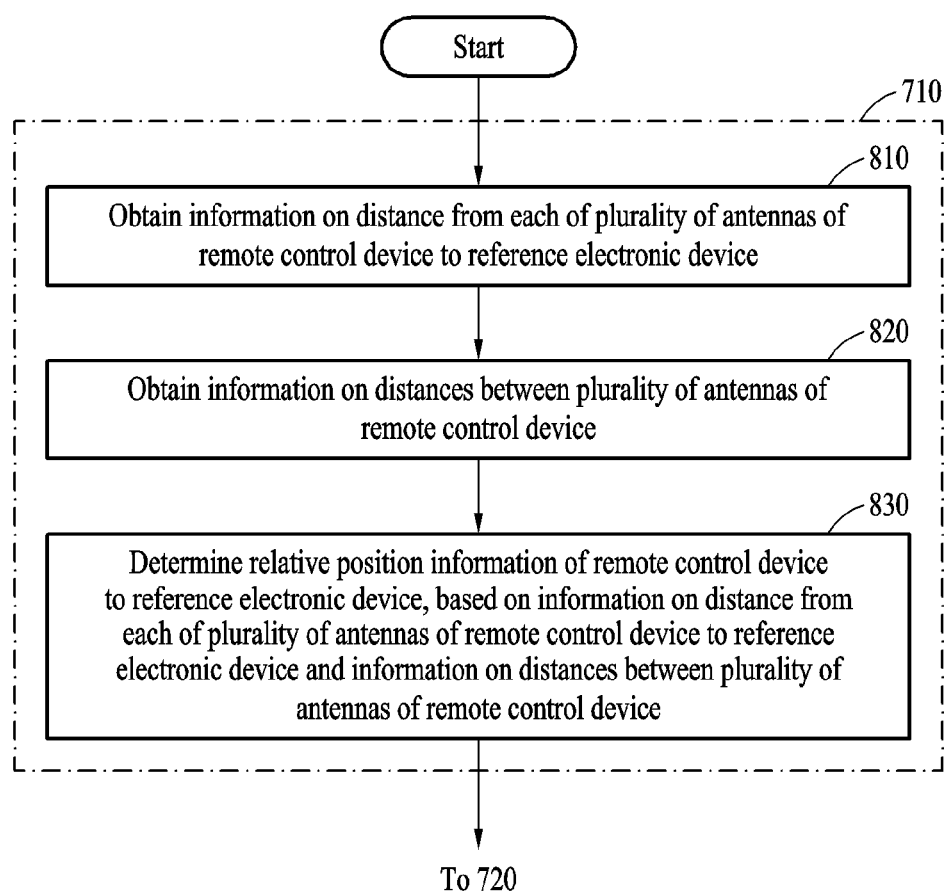
FIG. 8 is a flowchart illustrating an example operation of determining relative position information of a remote control device to a reference electronic device, according to various embodiments.

FIG. 8 is a flowchart illustrating an example operation of determining relative position information of a remote control device to a reference electronic device, according to various embodiments.

Operations 810 through 830 may, for example, correspond to an operation (e.g., operation 710 of FIG. 7) for determining the relative position information of the remote control device to the reference electronic device as described with reference to FIG. 7.

In operation 810, the processor 130 may obtain information on a distance from each of a plurality of antennas of the remote control device 200 to the reference electronic device 100.

In operation 820, the processor 130 may obtain information on distances between the plurality of antennas of the remote control device 200.

As described with reference to FIG. 4, for example, based on a ToA method of UWB communication, the distances d1, d2, and "b" of FIG. 5A may be obtained or measured, and the processor 130 may obtain information on the distances in operations 810 and 820.

In operation 830, the processor 130 may determine the relative position information of the remote control device 200 to the reference electronic device 100. As described with reference to FIGS. 5B and 5C, the processor 130 may determine information on an angle $\psi_1$ generated in a direction based on positions of the plurality of antennas of the remote control device 200, a direction from the remote control device 200 to the reference electronic device 100, a distance "d" from the remote control device 200 to the reference electronic device 100, based on information on the distances (e.g., the distance "b" of FIG. 5A) between the plurality of antennas and information on the distance (e.g., the distances d1 and d2 of FIG. 5A) from each of the plurality of antennas of the remote control device 200 to the reference electronic device 100.

Figure 9A:
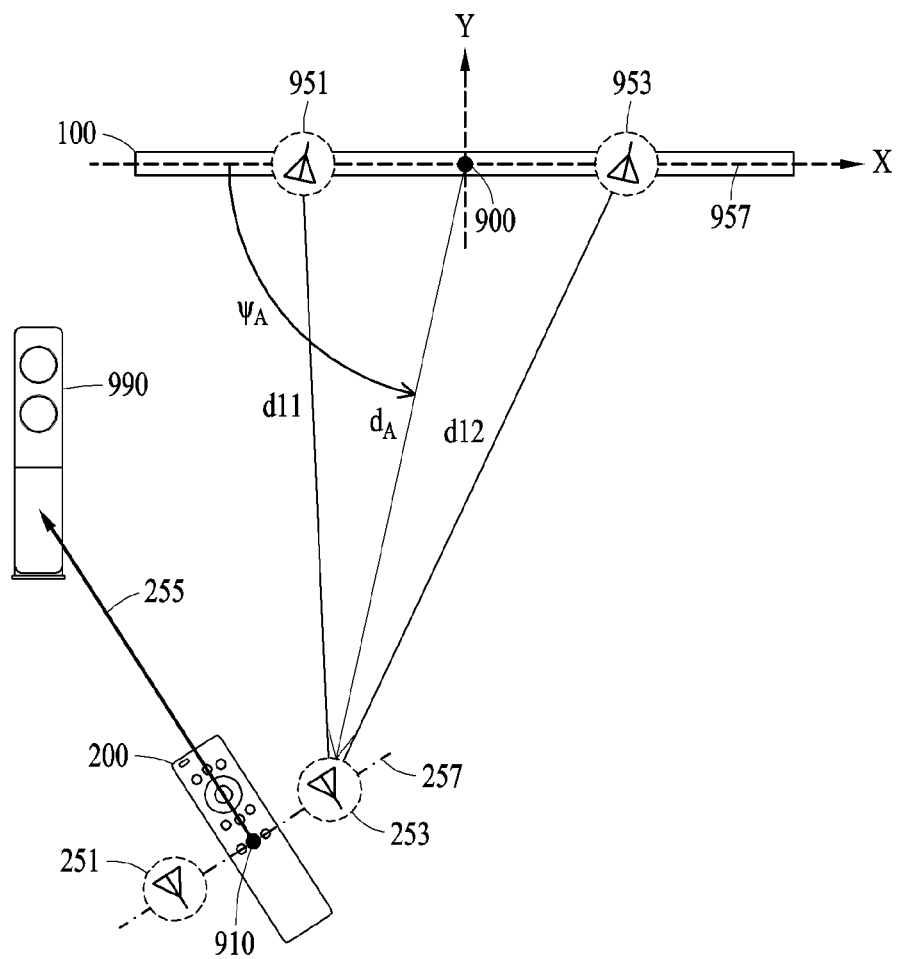
FIGS. 9A, 9B, and 9C are diagrams each illustrating an example operation of determining an aiming direction of a remote control device in a global coordinate system based on a reference electronic device according to various embodiments.
Figure 9B:
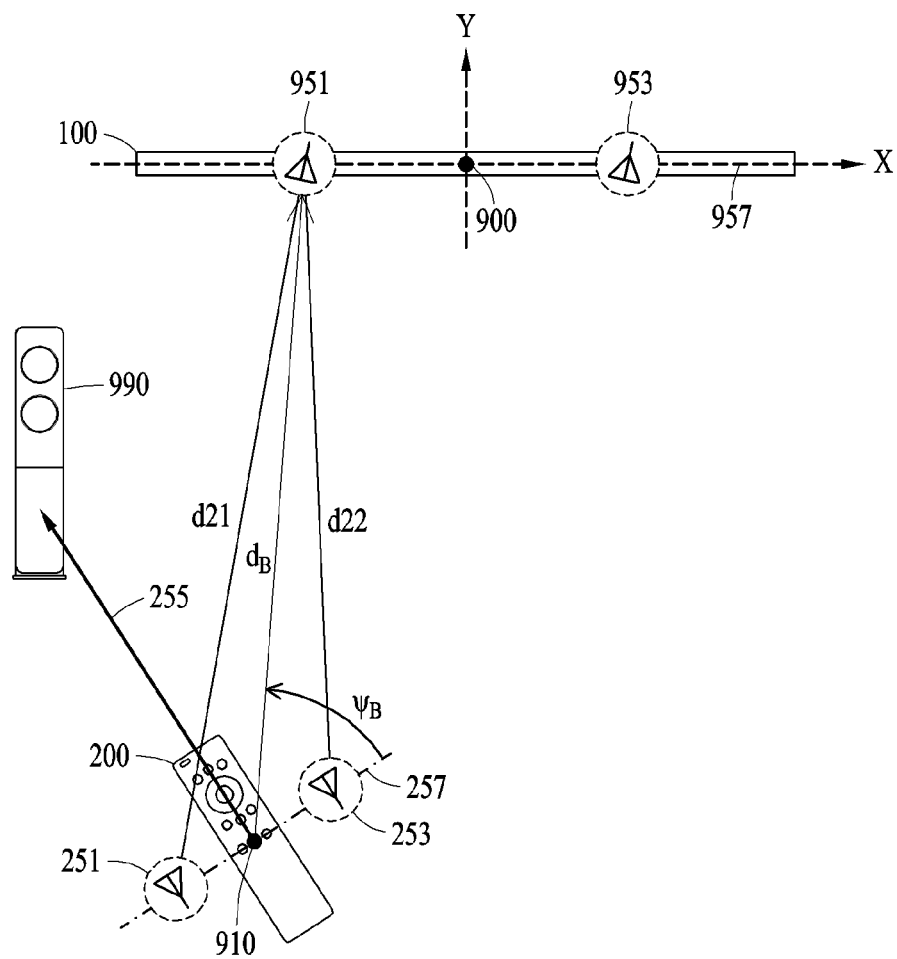
Figure 9C:
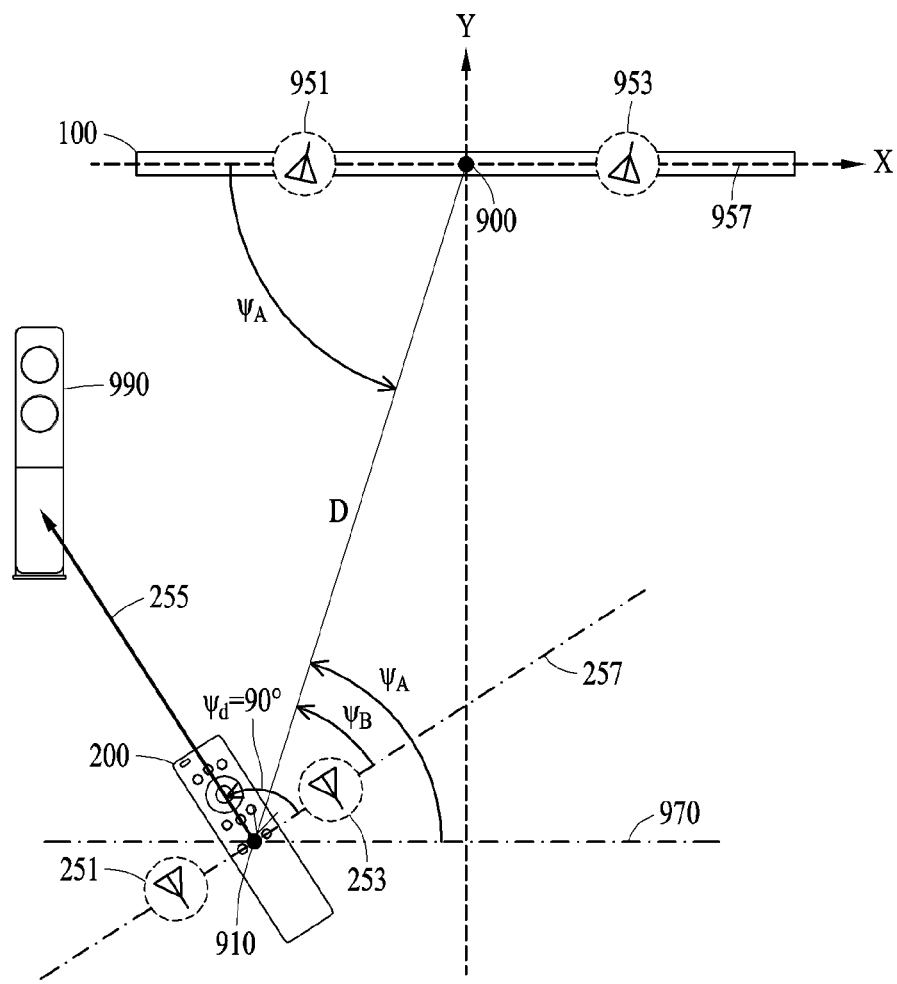

FIGS. 9A, 9B, and 9C are diagrams each illustrating an example operation of determining an aiming direction of the remote control device 200 in a global coordinate system based on the reference electronic device 100, based on various embodiments.

The descriptions provided with reference to FIGS. 1 through 8 are not repeated here. As an example, the reference electronic device 100 may include at least some of components described above with reference to FIGS. 1A and 1B, and the descriptions provided with reference to FIGS. 2A and 2B may be applied to the remote control device 200. As another example, example operations described with reference to FIGS. 9A, 9B, and 9C may be performed by the processor 130 of the reference electronic device 100 in an indoor environment described above with reference to FIG. 3.

FIGS. 9A, 9B, and 9C may be diagrams each illustrating aspects of an example process of setting a global coordinate system based on the reference electronic device 100 in an indoor environment (e.g., the indoor environment of FIG. 3) according to various embodiments. As described with respect to the aiming direction 255 of the remote control device 200 in FIG. 2A, FIGS. 9A, 9B, and 9C may also be based on an indoor environment in which the reference electronic device 100 and the remote control device 200 operate being viewed from above. For example, FIGS. 9A, 9B and 9C may correspond to an X-Y plane that is an indoor environment viewed from the +Z axis of FIG. 2A.

The example embodiment to be described with reference to FIGS. 9A, 9B, and 9C may be different from the methods described above with reference to FIGS. 5A, 5B, 5C, 6A, and 6B. For example, in a method of determining an aiming direction of the remote control device 200 described above with reference to FIGS. 5A, 5B, 5C, 6A, and 6B, one antenna (e.g., the antenna 155 of FIGS. 5A, 6A, and 6B) is provided to the reference electronic device 100. However, in the example embodiments to be described with reference to FIGS. 9A, 9B, and 9C, the reference electronic device 100 may have two antennas 951 and 953. In the example embodiment to be described with reference to FIGS. 9A, 9B, and 9C, however, the number of antennas of the reference electronic device 100 is not limited to two, and more than two antennas may be used, for example, to improve positioning accuracy.

In addition, the methods described above with reference to FIGS. 5A through 6B may use information on a yaw angle (e.g., the angle $\psi_3$ of FIGS. 6A and 6B) of the reference electronic device 100 and information on a yaw angle (e.g., the angle $\psi_2$ of FIGS. 6A and 6B) of the remote control device 200, but the example embodiments described with reference to FIGS. 9A, 9B, and 9C may not use information on the yaw angles.

In the example embodiments described with reference to FIGS. 9A, 9B, 9C, operations may be described based on the processor 130 of the reference electronic device 100, but based on communication, the operations may be performed by the processor 230 of the remote control device 200 or by a server. Referring to FIGS. 9A, 9B, and 9C, the reference electronic device 100 may include a plurality of antennas (e.g., the antennas 951 and 953) for UWB communication, and the remote control device 200 may include a plurality of antennas (e.g., the antennas 251 and 253) for UWB communication. However, a communication method is not limited to the UWB communication, and various communication methods, such as Bluetooth and Wi-Fi, may be used.

FIG. 9A illustrates aspects of a process of obtaining a distance $d_A$ and an angle $\psi_A$. FIG. 9B illustrates aspects of a process of obtaining a distance $d_B$ and an angle $\psi_B$.

Referring to FIG. 9A, the processor 130 of the reference electronic device 100 may obtain information on the angle $\psi_A$ generated from a straight line 957 based on positions of the plurality of antennas 951 and 953 of the reference electronic device 100 and a straight line, which corresponds to a distance $d_A$, from the reference electronic device 100 to the remote control device 200, and the distance $d_A$ from the reference electronic device 100 to the remote control device 200. When distance information is obtained based on the UWB communication, information on the distance dA may be obtained as described with reference to FIG. 4.

A process of obtaining information on the distance $d_A$ and the angle $\psi_A$ has been described with reference to FIGS. 5A, 5B, and 5C, and thus a detailed description thereon is not repeated. The information on the distance dA and the angle $\psi_A$ may be obtained by the processor 130 of the reference electronic device 130 or by the processor 230 of the remote control device 200 and be transmitted to the reference electronic device 100.

Referring to FIG. 9B, the processor 130 of the reference electronic device 100 may obtain information on the angle $\psi_B$ generated from a straight line 257 based on positions of the plurality of antennas 251 and 253 of the remote control device 200 and a straight line, which corresponds to a distance $d_B$, from the remote control device 200 to the reference electronic device 100, and the distance $d_B$ from the remote control device 200 to the reference electronic device 100. When distance information is obtained based on the UWB communication, information on the distance $d_B$ may be obtained as described with reference to FIG. 4.

A process of obtaining information on the distance $d_B$ and the angle $\psi_B$ has been described with reference to FIGS. 5A, 5B, and 5C, and thus a detailed description thereon is not repeated. The information on the distance $d_B$ and the angle $\psi_B$ may be obtained by the processor 130 of the reference electronic device 130 or by the processor 230 of the remote control device 200 and be transmitted to the reference electronic device 100.

FIG. 9C illustrates aspects of an example method of determining an aiming direction of the remote control device 200 in a global coordinate system based on the reference electronic device 100.

The processor 130 of the reference electronic device 100 may obtain information on the distances $d_A$ and $d_B$ and the angles $\psi_A$ and $\psi_B$ as described with reference to FIGS. 9A and 9B. A distance from a center 900 of two antennas 951 and 953 of the reference electronic device 100 to a center 910 of two antennas 251 and 253 of the remote control device 200 may be a distance D. A distance between the two antennas 951 and 953 or a distance between the two antennas 251 and 253 may be small enough to be ignored compared to the distance D, and thus the distance D may be the same as the distance $d_A$ or the distance $d_B$ described above with reference to FIGS. 9A and 9B.

As described with reference to FIG. 2A, an aiming direction 255 of the remote control device 200 may be a direction at an angle $\psi_d$, for example, 90°, to a straight line 257 corresponding to a plurality of antennas 251 and 253.

A diagram illustrated in FIG. 9C may be the global coordinate system based on the reference electronic device 100, and the processor 130 of the reference electronic device 100 may determine the aiming direction 255 of the remote control device 200, based on the distance D and the angles $\psi_A$, $\psi_B$, and $\psi_d$.

Referring to FIG. 9C, the processor 130 of the reference electronic device 100 may obtain information on coordinates 910 of the remote control device 200 in the global coordinate system using the center 900 of the reference electronic device 100 as an origin. For example, the coordinates 910 may be determined to be $(-D \times \cos(\psi_A), -D \times \sin(\psi_A))$.

The processor 130 may calculate an angle of an aiming direction 255 of the remote control device 200 in the global coordinate system based on the reference electronic device 100. For example, the angle of the aiming direction 255 of the remote control device 200 in the global coordinate system based on the reference electronic device 100 may be $\psi_A - \psi_B + \psi_d$.

The angle of the aiming direction 255 of the remote control device 200 in the global coordinate system based on the reference electronic device 100 may be a yaw angle on the X-Y plane as described with reference to FIG. 2A. As described with reference to FIG. 2B, the processor 230 of the remote control device 200 may obtain information on a pitch angle value and/or a roll angle value of the remote control device 200 through the sensing unit 291 and transmit the obtained information to the reference electronic device 100. The processor 130 of the reference electronic device 100 may calibrate aiming information of the remote control device 200, based on the received information on the pitch and roll values of the remote control device 200.

The processor 120 of the reference electronic device 100 may determine a target device to be controlled, based on an angle between the coordinates 670 and the aiming direction 255 of the remote control device 200 in the global coordinate system.

As described with reference to FIGS. 6A and 6B, a sensible region, in a coordinate system, of devices (e.g., the first and second devices 310 and 320 of FIG. 3) in an indoor environment (e.g., the indoor environment of FIG. 3) may be preregistered.

A device control input (e.g., power-on) through the remote control device 200 may be transmitted to the reference electronic device 100, and the processor 130 may calculate an angle of the aiming direction 255 of the remote control device 200 and information on a position (e.g., the coordinates 910), in the coordinate system, of the remote control device 200 at a time when the device control input is received as described with reference to FIGS. 9A, 9B, and 9C.

The processor 130, based on the coordinates 910 and the angle, may determine, as a target device to be controlled, a device 990 corresponding to an overlapping sensible region among preregistered sensible regions of devices (e.g., the first and second devices 310 and 320 of FIG. 3) in an indoor environment.

The processor 130 may control the target device, based on a user input. For example, the processor 130 may turn on the device 990 to be controlled, based on a power-on input provided to the remote control device 200.

By setting a global coordinate system based on the reference electronic device 100 in an indoor environment, the user may control the target device through the remote control device 200 without a separate space setting to identify a position of the remote control device 200.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   communication circuitry configured to perform communication through one or more antennas;
   a sensor configured to measure a yaw angle of the electronic device;
   a memory configured to store computer-executable instructions; and
   at least one processor configured to execute the computer-executable instructions by accessing the memory,
   wherein
   the computer-executable instructions, when executed, configure one or more of the at least one processor to control the electronic device to:
      determine relative position information of a remote control device to the electronic device,
      based on the relative position information, yaw angle information of the electronic device that is measured by the sensor, and yaw angle information of the remote control device, calculate a yaw angle of an aiming direction of the remote control device in a global coordinate system, based on coordinates of the remote control device and on the electronic device, and
      based on the coordinates of the remote control device and the yaw angle of the aiming direction of the remote control device, determine a target device to be controlled by the remote control device.

2. The electronic device of claim 1, wherein
   the computer-executable instructions further configure one or more of the at least one processor to control the electronic device to:
      when the target device to be controlled has been determined, control the target device by the remote control device.

3. The electronic device of claim 1, wherein
   the computer-executable instructions further configure one or more of the at least one processor to control the electronic device to:
      based on the yaw angle of the aiming direction of the remote control device in the global coordinate system, a pitch angle of the remote control device, and a roll angle of the remote control device, calibrate aiming information of the remote control device.

4. The electronic device of claim 1, wherein
   the relative position information comprises:
      information on a distance from the remote control device to the electronic device, and information on a direction from the remote control device to the electronic device and an angle corresponding to the aiming direction of the remote control device.

5. The electronic device of claim 1, wherein
the relative position information is determined based on:
information on a distance from each of a plurality of antennas included in the remote control device to the electronic device, and
information on distances between the plurality of antennas.

6. The electronic device of claim 1, wherein
the yaw angle of the remote control device is measured by a sensor included in the remote control device.

7. The electronic device of claim 1, wherein
the electronic device performs ultra-wideband (UWB) communication with the remote control device.

8. The electronic device of claim 1, wherein
the computer-executable instructions further configure one or more of the at least one processor to control the electronic device to:
determine the target device to be controlled, based on the coordinates of the remote control device in the global coordinate system, the yaw angle of the aiming direction of the remote control device, and a preregistered sensible region.

9. The electronic device of claim 1, wherein
the remote control device includes two antennas, and
the aiming direction of the remote control device is determined to be a direction perpendicular to a straight line connecting the two antennas.

10. An operating method of an electronic device, the operating method comprising:
determining relative position information of a remote control device to the electronic device;
based on the relative position information, yaw angle information of the electronic device, and yaw angle information of the remote control device, calculating coordinates of the remote control device and a yaw angle of an aiming direction of the remote control device in a global coordinate system based on the electronic device; and
based on the coordinates of the remote control device and the yaw angle of the aiming direction of the remote control device, determining a target device to be controlled by the remote control device.

11. The operating method of claim 10, further comprising:
when the target device to be controlled has been determined, controlling the target device by the remote control device.

12. The operating method of claim 10, further comprising:
based on the yaw angle of the aiming direction of the remote control device in the global coordinate system, a pitch angle of the remote control device, and a roll angle of the remote control device, calibrating aiming information of the remote control device.

13. The operating method of claim 10, wherein
the relative position information comprises:
information on a distance from the remote control device to the electronic device, and
information on a direction from the remote control device to the electronic device and an angle corresponding to the aiming direction of the remote control device.

14. The operating method of claim 10, wherein
the relative position information is determined based on:
information on a distance from each of a plurality of antennas included in the remote control device to the electronic device, and
information on distances between the plurality of antennas.

15. The operating method of claim 10, wherein
the yaw angle of the remote control device is measured by a sensor included in the remote control device.

16. The operating method of claim 10, wherein
the electronic device performs ultra-wideband (UWB) communication with the remote control device.

17. The operating method of claim 10, wherein
the determining of the target device to be controlled comprises:
determining the target device to be controlled, based on the coordinates of the remote control device in the global coordinate system, the yaw angle of the aiming direction of the remote control, and a pre-registered sensible region.

18. The operating method of claim 10, wherein
the remote control device includes two antennas, and
the aiming direction of the remote control device is determined to be a direction perpendicular to a straight line connecting the two antennas.

19. A non-transitory computer-readable recording medium configured to store a program which, when executed by a processor of an electronic device, configures the processor to control the electronic device to perform:
determining relative position information of a remote control device to the electronic device;
based on the relative position information, yaw angle information of the electronic device, and yaw angle information of the remote control device, calculating coordinates of the remote control device and a yaw angle of an aiming direction of the remote control device in a global coordinate system based on the electronic device; and
based on the coordinates of the remote control device and the yaw angle of the aiming direction of the remote control device, determining a target device to be controlled by the remote control device.

20. The non-transitory computer-readable recording medium of claim 19, wherein
the determining of the target device to be controlled comprises:
determining the target device to be controlled, based on the coordinates of the remote control device in the global coordinate system, the yaw angle of the aiming direction of the remote control device, and a preregistered sensible region, and
when the target device to be controlled has been determined,
the program is configured to cause the electronic device to perform:
controlling the target device by the remote control device.

* * * * *